(12) United States Patent
Arulambalam et al.

(10) Patent No.: US 7,730,238 B1
(45) Date of Patent: Jun. 1, 2010

(54) BUFFER MANAGEMENT METHOD AND SYSTEM WITH TWO THRESHOLDS

(75) Inventors: Ambalavanar Arulambalam, Macungie, PA (US); Jian-Guo Chen, Basking Ridge, NJ (US); Nevin C. Heintze, Bethlehem, PA (US); Qian Gao Xu, Shanghai (CN); Jun Chao Zhao, Shanghai (CN)

(73) Assignee: Agere System Inc., Allentown, PA (US)

( * ) Notice: Subject to any disclaimer, the term of this patent is extended or adjusted under 35 U.S.C. 154(b) by 438 days.

(21) Appl. No.: 11/539,399

(22) Filed: Oct. 6, 2006

Related U.S. Application Data

(60) Provisional application No. 60/724,692, filed on Oct. 7, 2005.

(51) Int. Cl.
*G06F 3/00* (2006.01)
*G06F 5/00* (2006.01)
*H04L 12/28* (2006.01)

(52) U.S. Cl. .............................. 710/52; 710/56; 370/412

(58) Field of Classification Search .................. None
See application file for complete search history.

(56) References Cited

U.S. PATENT DOCUMENTS

| 5,784,698 A * | 7/1998 | Brady et al. ................. 711/171 |
| 6,614,756 B1 * | 9/2003 | Morgenstern et al. ....... 370/230 |
| 7,107,367 B1 * | 9/2006 | Hughes ....................... 710/39 |
| 2006/0056436 A1 * | 3/2006 | Horikawa ................... 370/412 |
| 2006/0164979 A1 * | 7/2006 | Pirbhai et al. ............... 370/229 |

* cited by examiner

*Primary Examiner*—Henry W. H. Tsai
*Assistant Examiner*—Tushar S Shah

(57) ABSTRACT

A method comprises providing a free buffer pool in a memory including a non-negative number of free buffers that are not allocated to a queue for buffering data. A request is received to add one of the free buffers to the queue. One of the free buffers is allocated to the queue in response to the request, if the queue has fewer than a first predetermined number of buffers associated with a session type of the queue. One of the free buffers is allocated to the queue, if a number of buffers in the queue is at least as large as the first predetermined number and less than a second predetermined number associated with the session type, and the number of free buffers is greater than zero.

15 Claims, 20 Drawing Sheets

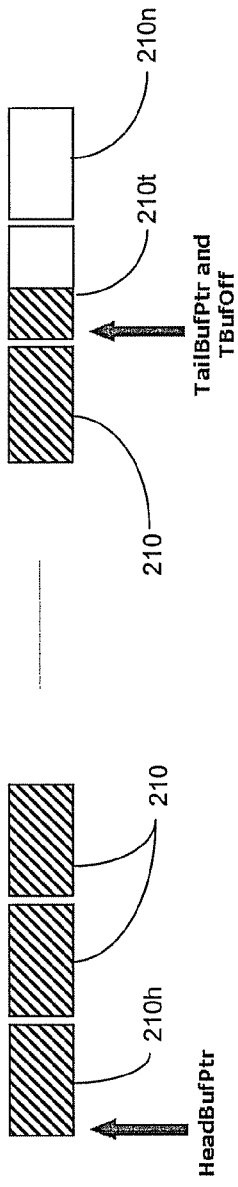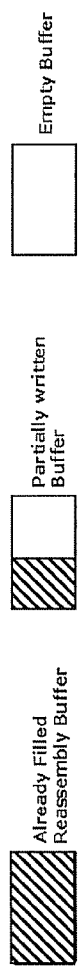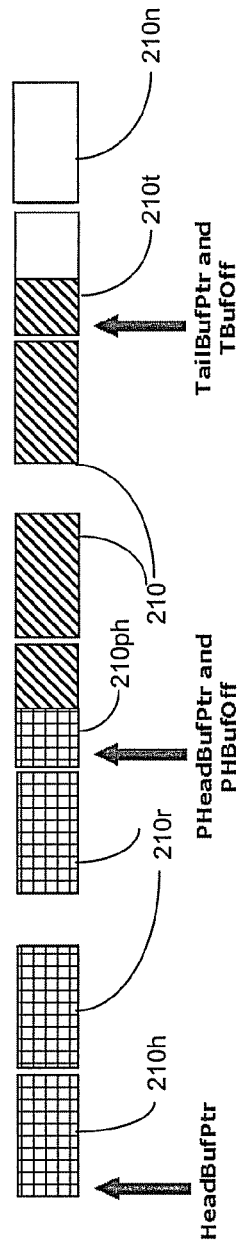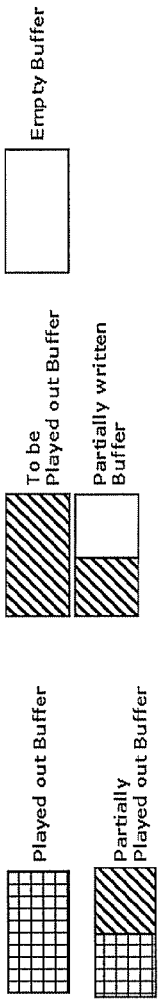
FIG. 2B
FIG. 2C

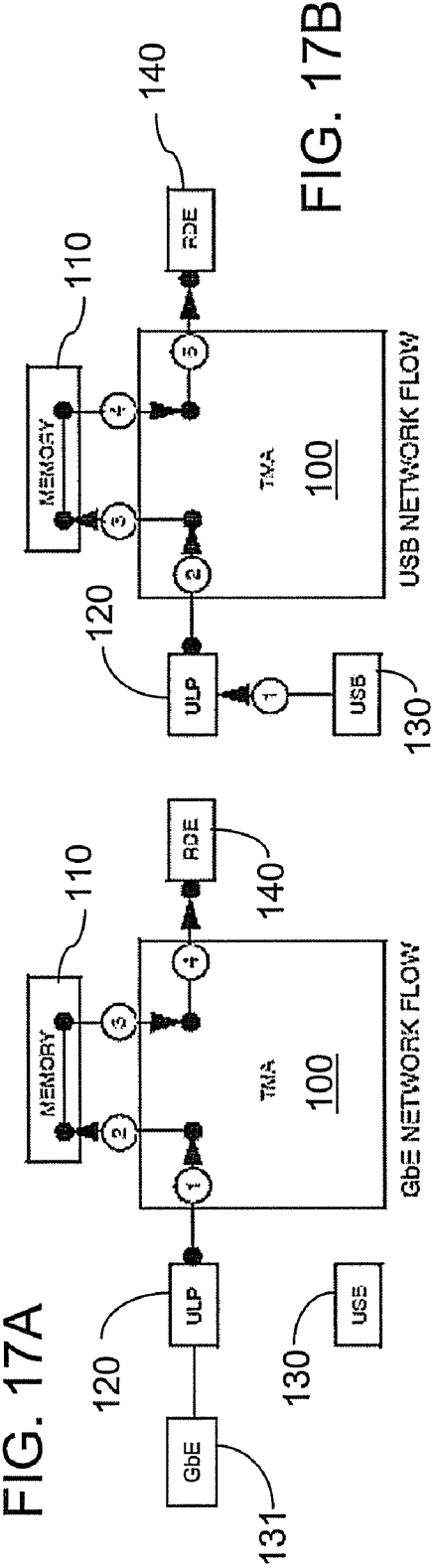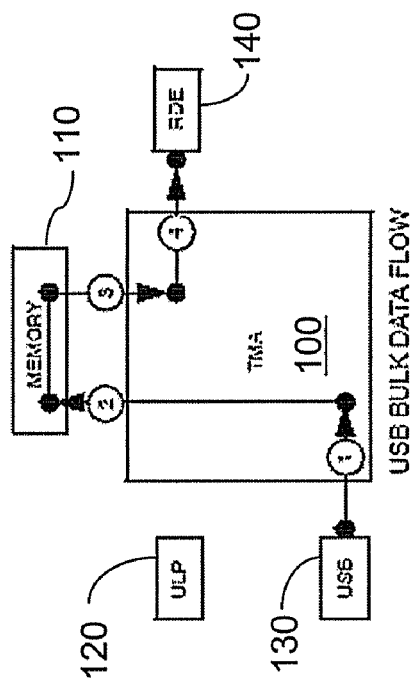
FIG. 17A
FIG. 17B
FIG. 17C

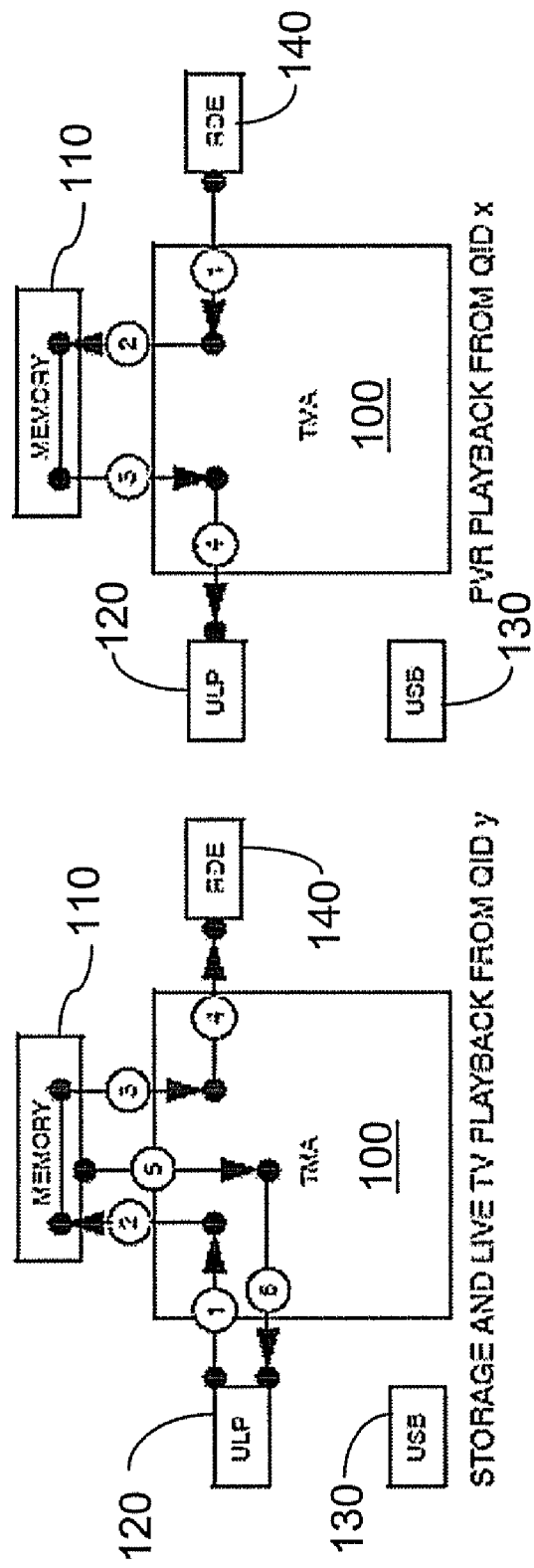

BUFFER MANAGEMENT METHOD AND SYSTEM WITH TWO THRESHOLDS

This application is a continuation in part of U.S. patent application Ser. No. 11/226,507, filed Sep. 13, 2005, and is a continuation in part of U.S. patent application Ser. No. 11/273,750, filed Nov. 15, 2005, and is a continuation in part of U.S. patent application Ser. No. 11/364,979, filed Feb. 28, 2006, and is a continuation in part of U.S. patent application Ser. No. 11/384,975, filed Mar. 20, 2006, and claims the benefit of U.S. provisional patent application Nos. 60/724,692, filed Oct. 7, 2005, 60/724,464, filed Oct. 7, 2005, 60/724,722, filed Oct. 7, 2005, 60/725,060, filed Oct. 7, 2005, and 60/724,573, filed Oct. 7, 2005, all of which applications are expressly incorporated by reference herein in their entireties.

FIELD OF THE INVENTION

The present invention relates to methods and systems for buffering data.

BACKGROUND

The queues for most media servers are based on software management. They may not handle large number of simultaneous media streams, since the management of queues are primarily based on software.

Competing solutions offer bandwidth management under software control. Some offer simple round robin schemes without considering priorities of sessions. Some offer strict priority solutions without considering bandwidth considerations. These software solutions do not scale with number of sessions, and provide unfair access to bandwidth and increased latency, resulting in poor quality of media streaming.

SUMMARY OF THE INVENTION

In some embodiments, a method comprises providing a free buffer pool in a memory including a non-negative number of free buffers that are not allocated to a queue for buffering data. A request is received to add one of the free buffers to the queue. One of the free buffers is allocated to the queue in response to the request, if the queue has fewer than a first predetermined number of buffers associated with a session type of the queue. One of the free buffers is allocated to the queue, if a number of buffers in the queue is at least as large as the first predetermined number and less than a second predetermined number associated with the session type, and the number of free buffers is greater than zero. In some embodiments, a system is provided for performing the method. In some embodiments, a computer readable medium is provided with pseudocode for generating an application specific integrated circuit for performing the method.

BRIEF DESCRIPTION OF THE DRAWINGS

FIGS. 2A-2C are diagrams of a buffer queue included in the memory shown in FIG. 1.

FIGS. 17A-17C are diagrams showing storage of data through the memory buffers to disk.

FIGS. 19A and 19B are diagrams showing storage and playback of a live TV stream

DETAILED DESCRIPTION

This description of the exemplary embodiments is intended to be read in connection with the accompanying drawings, which are to be considered part of the entire written description.

Figure 1:
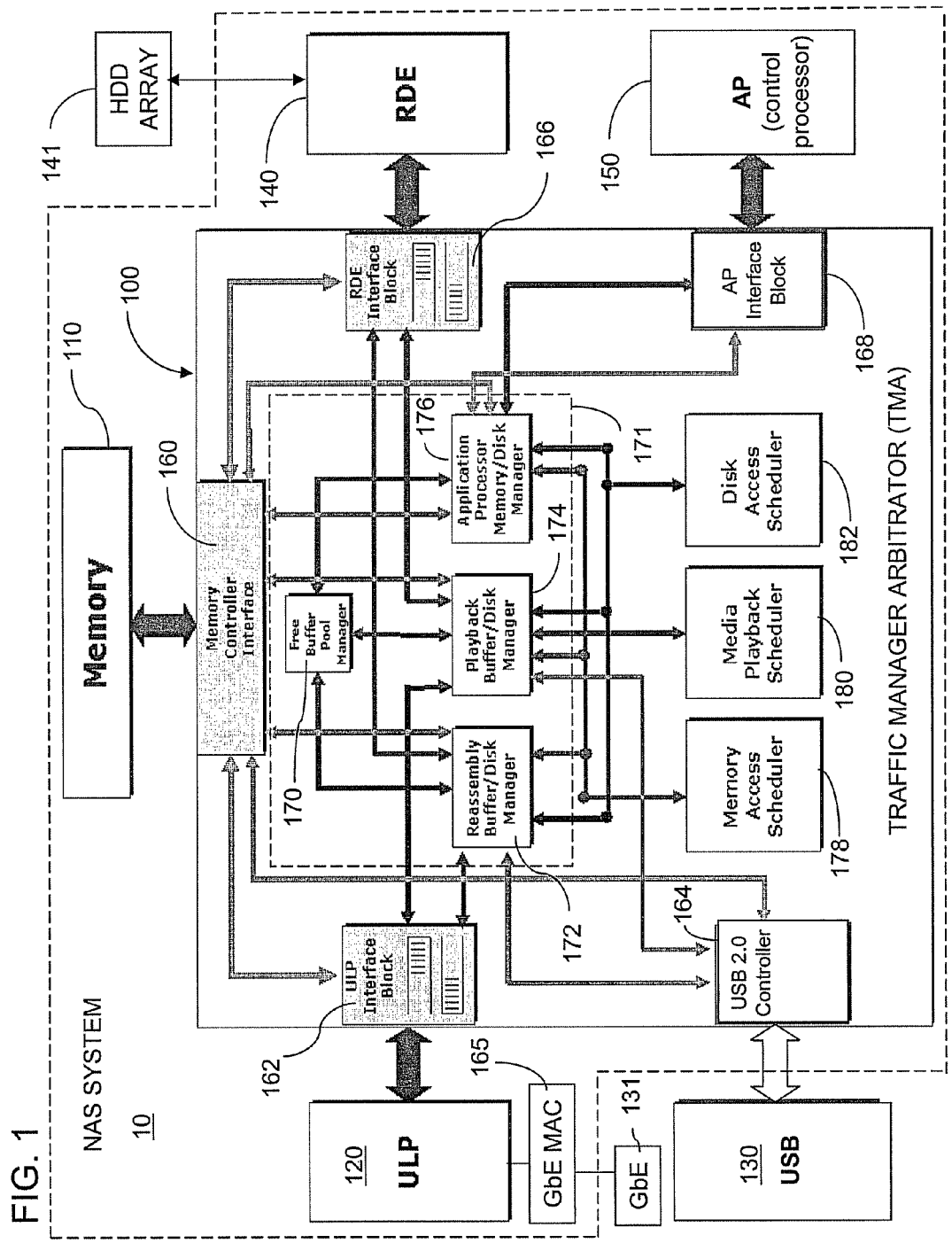
FIG. 1 is a block diagram of a network attached storage system.

FIG. 1 is a block diagram of an exemplary media server and network attached storage (NAS) system 10 for a home media server application. In NAS system 10, data from multiple sessions are concurrently stored to a disk array 141, played out to devices on a home network via USB port 130 or Ethernet port 131, and/or used for control traffic. The term "session" broadly encompasses any open connection that has activity, in which data are being received from the media interface and stored in the disk 141, being read out from the disk 141 to a local device or a network, or any open connection used by control processor (application processor, or AP) 150 for processor functions that operate system 10 (e.g., retrieving data or instructions from memory). The sessions use a share memory 110 as an intermediate storage medium.

Intermediate storage is provided by buffers in the memory 110 while storing incoming data from network 131 or while streaming out data from the disk array 141 toward the network 131. Also, control traffic arriving from the network is managed in the memory 110. Data stream queues, each comprising a plurality of buffers, are used to manage such simultaneous data streams in memory.

An exemplary embodiment provides an efficient way to manage multiple media streams and control traffic in an intermediate memory 110. The approach involves a queue structure, management of queues of different streams, and control of the amount of data to be stored in a queue. Furthermore, the approach provides mechanisms to determine when a queue becomes eligible to be streamed, by defining emptying and refilling policies.

Media Server

The NAS system 10 is connected to input sources, such as a USB device 130 or an Ethernet local area network 131, and one or more mass storage devices, such as a hard disk drive (HDD) array 141. In system 10, data from multiple media sessions are simultaneously being stored to the disk array 141, and played out from the disk array 141 to devices (e.g., PCs, TVs with network capabilities, digital video recorders (DVRs), personal video recorders (PVRs), and the like, not shown) on a home network.

The various communications paths in system 10 are also used for control traffic sessions. The term, "session" denotes an open connection that has activity. For example, in a receive session, data are being received from the media interface, reassembled and stored in a disk of HDD array 141. In a transmit session, data are read out from a disk of HDD array 141 (or other mass storage device), for playback on a TV, stereo, computer or the like. In a control processor session, an open connection is used by the control processor 150 for processor needs, such as retrieving data to be loaded into registers within system 10. All the sessions use a shared memory 110 as an intermediate medium.

In some embodiments, the memory 110 is implemented by a single-port DDR-2 DRAM. Double Data Rate (DDR) synchronous dynamic random access memory (SDRAM) is high-bandwidth DRAM technology. DDR SDRAM is cost-effective and suitable for a variety of processing market segments. DDR SDRAM has been used with data rates of 200 MHz, 266 MHz, 333 and 400 MHz buses. Other types of memory may be used to implement shared memory 110.

The system 10 includes a Traffic Manager Arbitrator (TMA) 100, which includes an exemplary memory controller interface 160. The TMA block 100 manages i) storage of media streams arriving via network 131, ii) handling of control traffic for application processing, and iii) playback traffic during retrieval from the HDD array 141. The TMA 100 controls the flow of all traffic among the network interface 165, USB controller 164, DDR2 memory 110, application processing functions 150, and the HDD array 141. The TMA 100 includes i) four buffer managers 170, 172, 174, 176 that handle memory buffer and disk management, and ii) three schedulers 178, 180, 182, that allocate the available memory access bandwidth of memory 110.

A reassembly buffer/disk manager (RBM) 172 manages the transfer of control packets or packetized media objects from the network interface 131 to the memory 110 for reassembly, and then, if appropriate, the transfer of the control packets or packetized media objects to the HDD array 141.

A media playback buffer/disk manager (PBM) 174 manages the transfer of data out of HDD array 141 to the memory 110, and then the transfer of the data from memory 110 to the upper layer protocol accelerator (ULP) 120 or USB controller 164 during playback.

The application processor memory manager (AMM) 176 provides the appropriate interfaces for control processor operations based on the data stored in the disks of HDD array 141 and the memory 110.

A free buffer pool manager (FBM) 170 allocates and de-allocates buffers when needed by the RBM 172, PBM 174 or AMM 176 and maintains a free buffer list, which free buffer list may be a last-in, first-out (LIFO) queue.

The memory access scheduler (MAS) 178, media playback scheduler (MPS) 180, and disk access scheduler (DAS) 182 manage the shared resources, such as memory access bandwidth and disk access bandwidth. The schedulers 178, 180 and 182 also provide a prescribed quality of service (QoS), in the form of allocated bandwidth and latency guarantees for media objects during playback. MAS 178 provides the RBM 172, PBM 174 and the AMM 176 guaranteed memory access bandwidth. MPS 180 arbitrates among multiple media transfer request and provides allocated bandwidth and ensures continuous playback without any interruption. DAS 182 provides guaranteed accesses to the disk 141 for the re-assembly process, playback process and AP access.

The exemplary TMA 100 interfaces to at least five modules/devices:

(1) memory 110, which can be a shared, single-port memory (such as a single-port DDR RAM);

(2) ULP accelerator 120, which offloads routine, repetitive TCP tasks from the host processor 150. Optionally, a local area network (LAN) port 131 is connected via ULP accelerator 120 using a LAN protocol, such as Gigibit Ethernet (GbE);

(3) USB 130 via USB controller 164;

(4) one or more non-volatile storage devices shown as, for example, the HDD array 141; and (5) AP 150, which may be an embedded ARM926EJ-S core by ARM Holdings, plc, Cambridge, UK, or other embedded microprocessor.

The memory controller interface 160 provides the interface for managing accesses to the memory 110 via a single memory port. An RDE Interface block 166 provides the interface to an RDE module 140 (where "RDE" denotes RAID decoder encoder, and "RAID" denotes a redundant array of inexpensive disks), which is in turn connected to the HDD array 141. The ULP Interface block 162 provides the interface to the ULP 120. A network interface block, GbE MAC 165, provides the interface to the local area network, GbE 131. The USB controller 164 provides the interface between the TMA 100 and the USB 130 (USB port 130 might preferably be a USB 2.0 (or higher) port). The Memory control Interface (TDI) block 160 provides an interface to the shared memory 110. An AP Interface block 168 provides an interface to the AP 150.

The system 10 receives media objects and control traffic from the network port 131 and the objects/traffic are first processed by the local area network controller (e.g., Gigabit Ethernet controller GbE MAC 165) and the ULP block 120. The ULP 120 transfers the media objects and control traffic to the TMA 100, and the TMA 100 stores the arriving traffic in the shared memory 110. In the case of media object transfers, the incoming object data are temporarily stored in the memory 110, and then transferred to the RDE 140 for storage in the HDD array 141. The TMA 100 also manages the retrieval requests from the disks of HDD array 141 toward the LAN interface 131. While servicing media playback requests, the data are transferred from the disks of HDD array 141 and stored in buffers in memory 110. The data in the buffers are then transferred out to the GbE port 131 via the ULP accelerator 120. The data are formed into packets for transmission using TCP/IP, with the ULP accelerator 120 performing routine TCP protocol tasks to reduce the load on the control processor 150. The TMA 100 manages the storage to and retrieval from the HDD array 141 by providing the appropriate control information to the RDE 140.

The control traffic destined for inspection by AP 150 is also stored in the shared memory 110, and AP 150 is given access to read the packets in memory 110. AP 150 also uses this mechanism to re-order any of the packets received out-of-order. A part of the shared memory 110 and disk 141 contains program instructions and data for AP 150. The TMA 100 manages the access to the memory 110 and disk 141 by transferring control information from the disk to memory and memory to disk. The TMA 100 also enables the control processor 150 to insert data and extract data to and from an existing packet stream.

The MAS 178 is responsible for the bandwidth distribution among each media session, while the memory controller interface 160 is responsible for managing all the memory accesses via a single memory port.

Sessions and Buffers

In order to facilitate data transfer in and out of memory 110 session queues are maintained. Within memory 110, the memory buffers with data are organized into FIFO linked lists called Session Queues and indexed using a queue identifier (QID). There is one Session Queue (and corresponding QID) per each session. The term QID is also used below to denote the session corresponding to a given queue identifier.

Figure 2A:
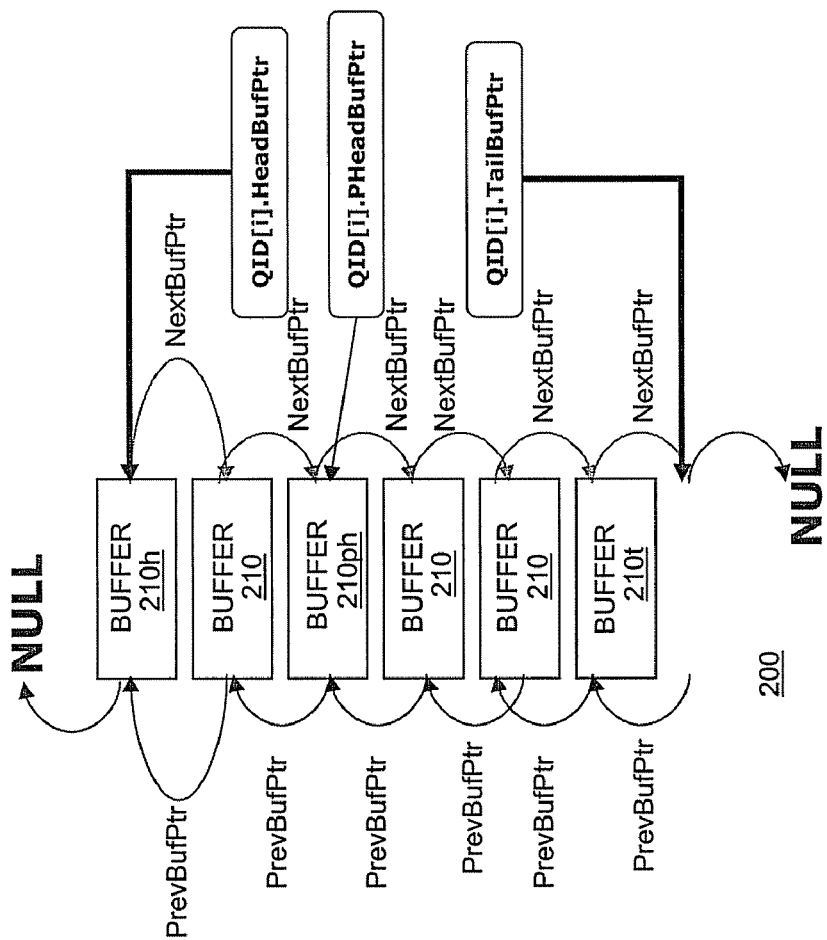

FIG. 2A is a diagram showing an exemplary session queue 200 comprising a linked list of buffers 210 in the memory 110. A buffer 210 within assessing queue 200 contains user data, a pointer (NextBufPtr) to the next buffer and a pointer (PrevBufPtr) to the previous buffer of the queue. For each session queue 200, a HeadBufPtr contains a pointer to the head buffer 210h of the queue (the least-recently read buffer) and a TailBufPtr points to the tail buffer 210t (the most-recently read buffer). In addition a PlayHeadBufPtr is maintained to point to the buffer 210ph currently being read out. A session table includes a respective entry for each session. Each entry in the session table includes the HeadBufPtr, PlayHeadBufPtr and TailBufPtr corresponding to a respective one of the sessions. Along with these pointers and using a Buffer Pointer Table (maintained by the FBM 170, and including a respective NextBufPtr and PrevBufPtr for each buffer in the free buffer pool), the complete buffer chain 200 for each session can be traversed in the forward and backward direction.

Note: in some situations, the buffer 210h, to which the HeadBufPtr points, is not removed (deallocated) from the session queue (buffer chain) 200 immediately when the data are read out from the head buffer 210h. Some applications may require caching of a few buffers or frames worth of data, in buffers from which the data have already been stored to a disk (in a storage operation) or passed on the network or peripheral device (during playback). After reading the contents of a buffer 210ph, generally, only the PHeadBufPtr is advanced to the next buffer, without de-allocating that buffer 210ph.

FIG. 2B is a diagram of the pointer structure for a buffer queue during a storage session. The queue has a plurality of buffers 210, including the least recently written (head) buffer 210h, the (tail) buffer 210t currently being written, and a newly allocated buffer 210n. The tail buffer is partially written, and the newly allocated buffer has not yet been written.

FIG. 2C is a diagram of the pointer structure for a buffer queue during a playback session. The queue has a plurality of buffers 210, including the least recently read (head) buffer 210h, other previously read buffers 210r that are still retained, the (play head) buffer 210ph currently being read, a tail buffer 210t currently written, and a newly allocated buffer 210n. The tail buffer 210t is partially written, and the newly allocated buffer 210n has not yet been written. The buffers 210h and 210r are retained to essentially provide a cache of recently read frames of video data.

Allocation of a New Buffer

In some embodiments, a method comprises allocating a first predetermined number of buffers in a memory to a queue associated with a session. The first predetermined number is associated with a session type of the session. Data are stored in and read from the queue. A free buffer pool includes a non-negative number of free buffers that are not allocated to the queue. At least one of the free buffers is allocated to the queue, if a number of buffers in the queue is less than a second predetermined number associated with the session type, and the number of free buffers is greater than zero.

A buffer allocation function is used to allocate a new buffer 210t for a given session (QID). The buffer space is divided into two portions: a guaranteed buffer portion that is used to provide a guaranteed minimum buffer space to each respective QID, and a shared buffer space that is used to provide supplemental buffer space to a subset of the QID's upon request, depending on the availability of shared buffer space. Each of the QIDs has two buffer occupancy thresholds: (1) GurBufTH, the guaranteed number of buffers to be allocated to the QID, and (2) MaxBufTH, the maximum number of buffers that can be allocated on the QID.

When a particular QID exceeds its guaranteed buffer allocation GurBufTH, it may draw buffers from the shared buffer pool. During this time the number of buffers available in the shared pool is reduced. When a buffer is deallocated the shared pool buffer count is increased.

There is a global threshold on total buffers allocated, TotBufTH. A delta threshold (corresponding to the difference between HeadBufPtr and PlayHeadBufPtr) determines how many buffers (that have already been read out) are retained after they are read, providing a small cache of recently read buffers. In some embodiments, this determination is made on an application specific basis. For example, if the session is behaving steadily, without high peaks and valleys in the traffic patterns (e.g., video is usually constant), the number of retained buffers depends on how fast the packets are processed.

As noted above, the queue structure uses multiple thresholds, and these are used to trigger various operations on the queue. These queue structures are summarized below.

MaxBuf—Maximum buffers allowed per session. No sessions are allowed to obtain more buffers than this value.

GurBuf—Guaranteed number of buffers allowed per session.

XferTH—Transfer Threshold—For storage session this value represents the amount of data needed to be occupied prior to transferring data to the disk array 141. For a playback session this value represents the number of buffers occupied prior to sending data to the network. It is preferable to avoid writing one packet at a time to the disk 141 to improve efficiency. Instead, it is preferable to write a larger amount XferTH of data in one transaction.

DRqstTH—Disk Request Threshold During playback, this value represents the trigger point to request additional data from the disk. When the buffer occupancy count for a session drops below this value, additional data are requested.

PlayHeadDeltaTH—During playback, part of the media stream being played back is kept in memory, in case of retransmission requests. Once the distance between HeadBufPtr and PlayHeadBufPtr exceeds this threshold, the Head buffer is de-allocated.

The buffer management scheme enables sessions to occupy a guaranteed number of buffers. In addition, when excess buffers are available, each of the sessions is allowed to take up additional buffers from the shared buffer pool.

Figure 3:
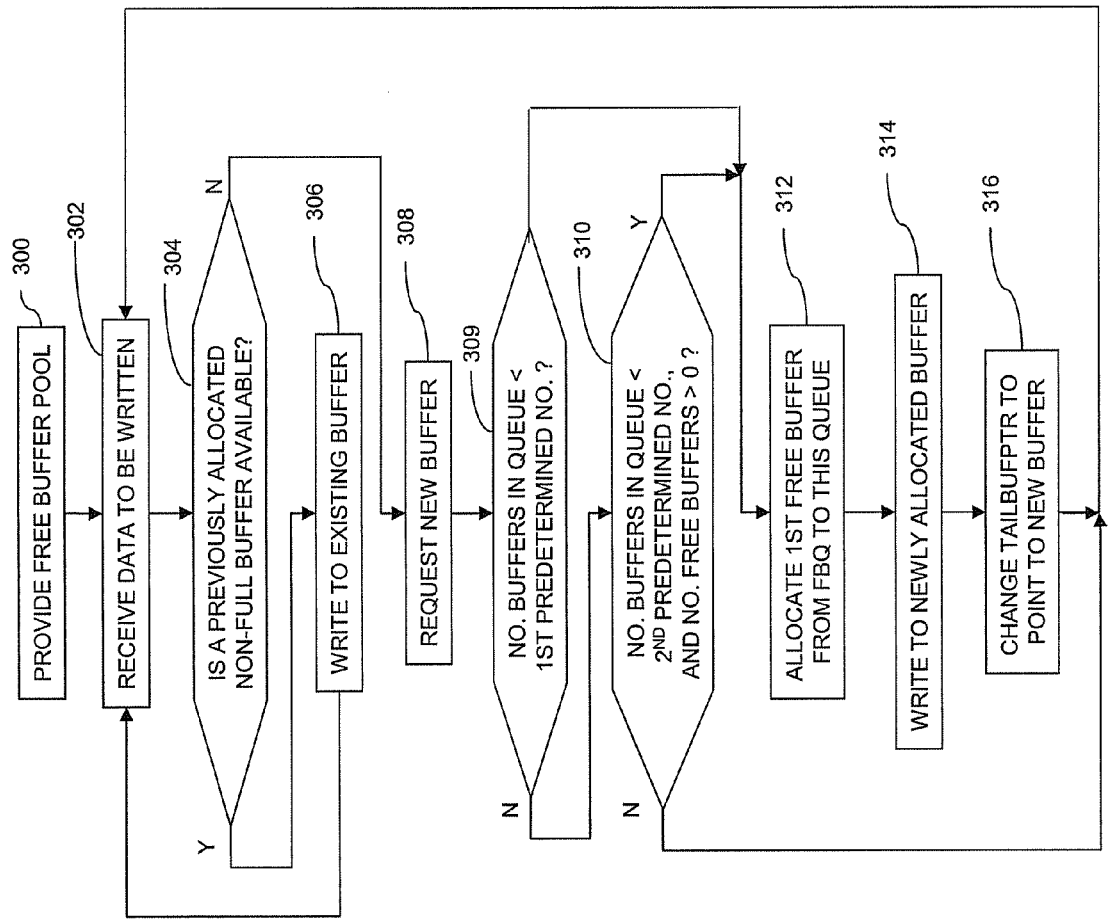
FIG. 3 is a flow chart of a buffer allocation method.

FIG. 3 is a flow chart diagram showing allocation of a new buffer in a single queue, to demonstrate the use of the two thresholds.

At step 300, at setup time, a free buffer pool is provided, including a non-negative number of free buffers that are not allocated to a specific queue 200.

At step 302, data are received, to be written to the buffer queue.

At step 304, a determination is made whether there is an allocated buffer for this buffer queue that is not full. If no previously allocated buffer has any space available, then step 308 is performed. If the most recent previously allocated buffer is not full, then step 306 is performed.

At step 306, the data are written to the previously allocated buffer, after which step 302 is executed next.

At step 308, a request is made to add a new buffer to this buffer queue.

At step 309, a determination is made whether the number of buffers in the buffer queue is less than GurBufTH (the first predetermined number representing the minimum guaranteed number of buffers associated with the session type). If the buffer queue has fewer than the guaranteed number of buffers, then step 312 is executed next. If the buffer queue already has at least the GurBufTH (the first predetermined number of) buffers, then step 310 is executed next.

At step 310, a determination is made whether a number of buffers 210 in the queue 200 is less than a second predetermined number (MaxBufTH) associated with the session type, and the number of free buffers in the free buffer queue is greater than zero. If so, then step 312 is executed. If the queue already has the maximum number of buffers MaxBufTH, or if there is no free buffer available, then steps 312-316 are skipped, and no new buffer is allocated to this buffer queue.

At step 312, the first free buffer in the FBQ is allocated to this buffer queue 200.

At step 314, the data are written to the newly allocated buffer.

At step 316, the TailBufPtr for queue 200 is updated, to make the newly allocated buffer the tail buffer. When step 316 is complete, the loop from step 302 to step 316 is repeated.

Figure 4:
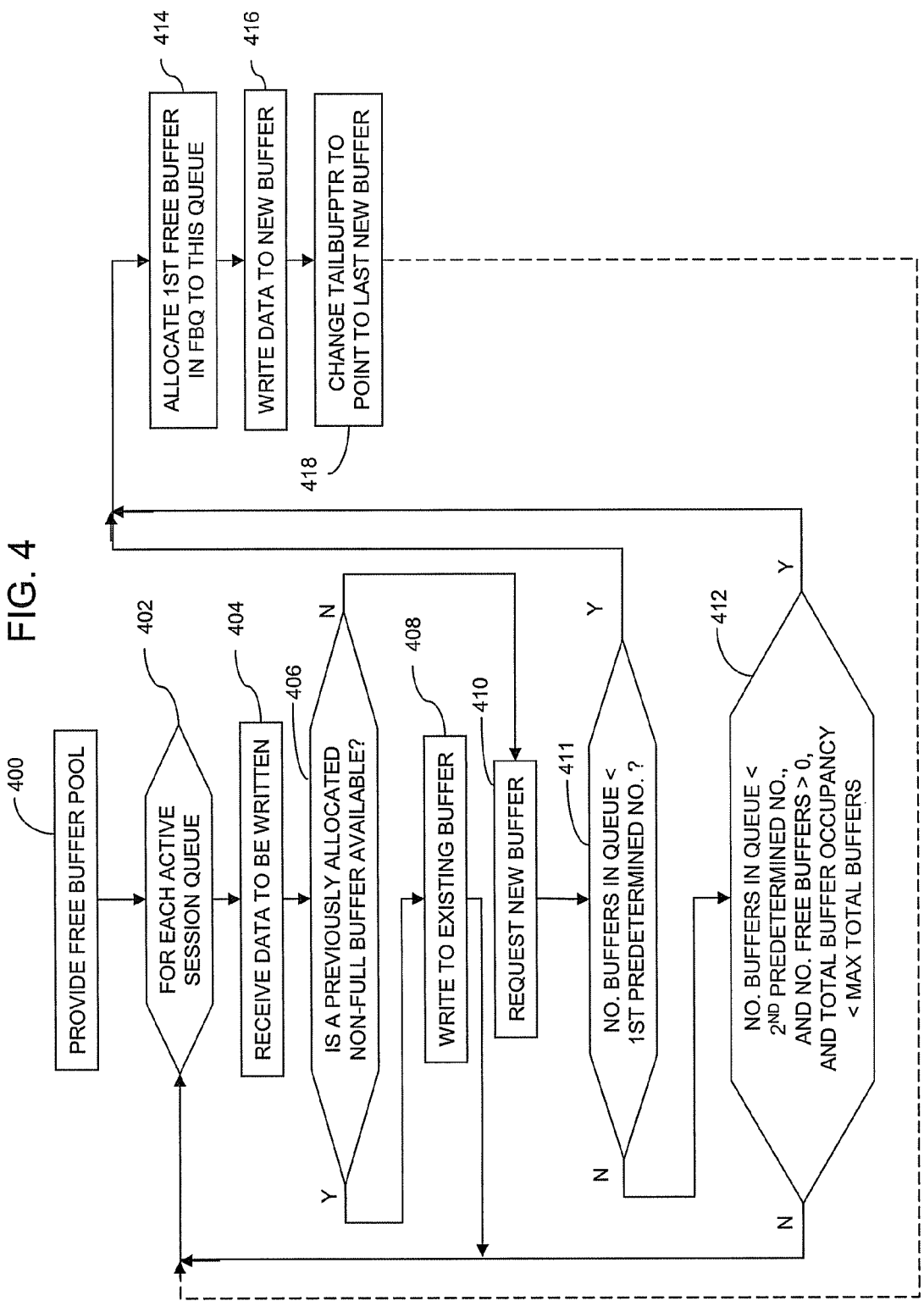
FIG. 4 is a flow chart of a method using the buffer allocation of FIG. 3 for a plurality of queues.

FIG. 4 is a flow chart diagram showing allocation of new buffers in a multi-session system having a plurality of buffer queues handling multiple concurrent connections.

At step 400 a free buffer pool is provided, including a non-negative number of free buffers that are not allocated to the queue 200.

At step 402, a loop including steps 404-418 is performed for each session queue while it is active.

At step 404, data are received, to be written to a buffer queue.

At step 406, a determination is made whether a previously allocated buffer for this buffer queue has any remaining available space. If no previously allocated buffer has available space, then step 410 is performed. If a previously allocated buffer has some available space, then step 408 is performed.

At step 408, the data are written to the previously allocated buffer, after which step 402 is executed next.

At step 410, a request is made to add a new buffer to this buffer queue.

At step 411, a determination is made whether the number of buffers in the buffer queue is less than GurBufTH (the first predetermined number representing the minimum guaranteed number of buffers associated with the session type). If the buffer queue has fewer than the guaranteed number of buffers, then step 414 is executed next. If the buffer queue already has at least the GurBufTH (the first predetermined number of) buffers, then step 412 is executed next.

At step 412, a three-part test individually determines whether an additional buffer can be allocated to the session queue for which the request is made. The determination includes: (1) whether a number of buffers in the respective queue is less than the second predetermined number (MaxBufTH) associated with the session type of that queue; (2) the number of free buffers in the free buffer queue is greater than zero; and (3) the total number of buffers allocated to all of the session queues is less than a maximum total buffer occupancy value. If so, then step 414 is executed. If the queue already has the maximum number of buffers MaxBufTH, or if there are no free buffers available, or the total number of buffers is equal to the maximum total buffer occupancy value, then the loop is performed for the next session, beginning at step 404.

At step 414, the first free buffer in the FBQ is allocated to this buffer queue 200.

At step 416, the data are written to the newly allocated buffer.

At step 418, the TailBufPtr for the queue is updated, to make the newly allocated buffer the tail buffer. After completion of step 418, the loop is performed for the next active session Exemplary pseudocode is provided below for the buffer allocation process.

```
Function AllocateBuffer(i)
begin
    if (FreeBufPtr == NULL AND rTotBufOcc <= rMAXBUFOCC) {// error condition
        // Buffer Chain is exhausted prematurely - set an error condition
        rStat0.FBPPtrExhaust = 1;
        ACCEPT = FALSE;
        exit( );
    }
    if (rTotBufOcc < rMAXBUFOCC) {// Occupancy is below the global threshold
        if (rBMQID[i].OccBuf < rBMQID[i].GurBuf) {
            ACCEPT = TRUE;
            if (rBMQID[i].OccBuf >= rBMQID[i].GurBuf - 1) {
                rCongStat[i].CongStat = 1;
                rStat0.CongInd[H/L] = 1;
            }
        }
        else if (rBMQID[i].OccBuf > rBMQID[i].GurBuf AND
                    rBMQID[i].OccBuf < rBMQID[i].MaxBuf) {
            if (rAvlShrBuf == 0) {// No more buffers to share
                ACCEPT = FALSE;
            } else {// Accept the pkt into the shared area
                ACCEPT = TRUE;
                rAvlShrBuf = rAvlShrBuf - 1;
            }
        }
        else if (rBMQID[i].OccBuf >= rBMQID[i].MaxBuf) {// QID has used up its
                    maximum
```

```
            ACCEPT = FALSE;
        }
    } else {
        ACCEPT = FALSE;
        rStat0.BufFull == 1; // Set the Status bit
    }
    if (ACCEPT == TRUE) {
        TotBufOcc = TotBufOcc + 1;
        TmpBufPtr = FreeBufPtr;
        TmpTailPtr = rBMQID[i].TailBufPtr;
        FreeBufPtr = FreeBufPtr.Next;
        rBufPtrTable[FreeBufPtr].Prev = NULL;
        rBufPtrTable[TmpBufPtr].Next = NULL;
        rBufPtrTable[TmpBufPtr].Prev = TmpTailPtr;
        rBMQID[i].TailBufPtr = TmpBufPtr;
        if (rBMQID[i].OccBuf == 0) {
            // operations if it is the first buffer
            rBMQID[i].HeadBufPtr = TmpBufPtr;
        }
        rBMQID[i].OccBuf = rBMQID[i].OccBuf + 1;
        PeakBufOcc = max(PeakBufOcc, TotBufOcc);
    }
end
```

Figure 5:
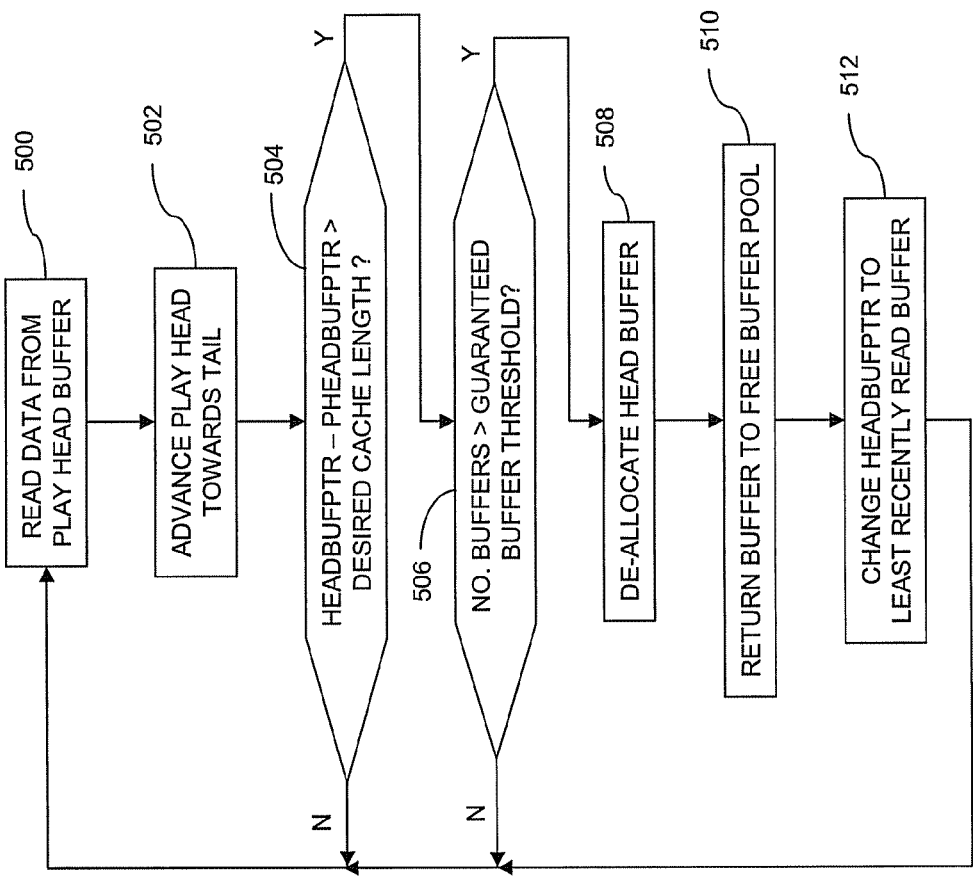
FIG. 5 is a flow chart showing buffer usage during a playback operation.

FIG. 5 is a flow chart diagram showing changes in the session queue when data are read from the queue.

At step 500, data are read from the play head buffer 210ph. Initially, the play head buffer 210ph is the head buffer 210h.

At step 502, as data that have been read out from the head buffer are retained (essentially in a cache), the play head buffer pointer (PHeadBufPtr) moves away from the head buffer 210h towards the tail buffer 210t.

At step 504, a determination is made whether the amount of retained data (indicated by the difference between the head (HeadBufPtr) and play head (PHeadBufPtr) of the queue is greater than the desired cache length (e.g., 10 to 15 buffers) of data to be retained. If so, then step 506 is performed. If the amount of retained data is less than the desired amount, then no buffer is de-allocated from the queue, and step 500 is executed to read more data from the queue, while increasing the number of already-read data that are retained in the buffer queue.

At step 506, a determination is made whether the number of buffers in the buffer queue is greater than the guaranteed number of buffers (GurBufTH) associated with the session type of the queue. If the number of buffers is greater than the GurBufTH, then step 508 is executed. If the number of buffers is less than or equal to GurBufTH, step 500 is executed to read more data from the queue.

At step 508 the head buffer is de-allocated.

At step 510, the de-allocated buffer is returned to the free buffer pool. A variable that tracks the number of available free buffers is increased.

At step 512, the head buffer pointer (HeadBufPtr) is changed to point to the buffer adjacent to the de-allocated buffer, i.e., the buffer containing the least recently used data in the queue.

The process of steps 500 to 512 is repeated, adding buffers to the tail end of the queue, storing data in the tail buffer, reading data from the play head buffer, storing data from the head buffer to disk (or playing data from the head buffer out to the network or a peripheral device), and de-allocating the head buffer.

It is useful to keep old data (i.e., data which have already been read) in the memory 110 to facilitate resending the data when a client or network loses a packet. It is undesirable to keep too much data for each session in the memory 110, because the memory would become full quickly. It is preferred to keep a few frames in memory, the exact number depending on the application. To keep a few frames, about 10 to 15 buffers are allocated to a given QID. For some applications, the application may not need to keep any buffers allocated after they are read, in which case the delta threshold would be 1. For such a session, the buffers are just deleted as the data stored therein are played.

As long as there are buffers available in the FBQ, and the number of buffers allocated to a given session is below the MaxBufTH for that session (QID), then additional buffers from the FBQ are allocated to that session upon request (i.e., when data are to be written, and the buffer to which data have most recently been written is full). The maximum number of buffers MaxBufTH and the guaranteed number of buffers GurBufTH determine the distance between the head and the tail.

In some embodiments, if there are multiple concurrent sessions, and there are not enough free buffers in the FBQ to provide each session with its maximum allowable number of buffers MaxBufTH, then the available free buffers are allocated by pro rating the buffers according to the number of extra buffers that would have been allocated to each session if that session were the only session receiving the extra buffers. For example, if there are two sessions, each of which could use another 20 buffers before reaching MaxBufTH, but there are only 20 free buffers available, each session is allocated 10 buffers.

In other embodiments sessions are prioritized by session type, so that extra buffers are assigned to the highest priority session until either (1) all the free buffers are used, or (2) the number of buffers assigned to the highest priority session reaches MaxBufTH.

The inclusion of two buffer thresholds is a useful feature when the connections are idle. For example, the user may be recording at home and doing a back-up session, without watching any video; the back-up task can use up the extra buffers in the FBQ. This speeds up the back-up process. On the other hand, if the user is watching the incoming data in real time while it is being recorded, then the back-up session may only get a limited number of buffers, because back-up has a lower priority then live recording. Then the back-up will get its guaranteed number of buffers, but won't affect the other sessions. (Whether any free buffers are available for the back-up session depends on whether there are additional concurrent sessions using the shared buffers from the FBQ).

Allocation of a new buffer may fail due to three reasons.

FreeBufPtr has a NULL value the total number of buffers occupied, rTotBufOcc, reaches the maximum number of buffers that can be occupied, rMaxBufOcc threshold For an individual QID, the buffer occupancy BuffOcc reaches the per QID MaxBufTH threshold In some embodiments, when any of the above condition is met the data are discarded automatically.

The amount of buffer space allocated to the guaranteed buffers and the amount allocated to the shared buffer space can be changed over time. For example, if there are many active sessions, the number of buffers allocated to the guaranteed buffer space can be increased. When there are relatively few active sessions, the number of buffers allocated to the shared buffer space can be increased.

The shared buffer pool can be updated during QID setup and tear down. During setup the GurBufTH value is allocated (to each QID) without exceeding total buffers available rMaxBufOcc. In the event that the portion of the buffer space allocated for guaranteed buffers is not sufficient to meet the guaranteed buffer allocation (GurBufTH) of every active session, a portion of the available buffers from the shared area could be made available for the guaranteed pool by decreasing the rAvlShrBuf during QID setup. During a QID tear down, any guaranteed buffers could be put back into the shared pool by increasing the rAvlShrBuf value. In some embodiments, when the final write is made to the register, the value of rAvlShrBuf in AP 150 and the value of rAvlShrBuf in TMA 100 are consolidated. In order to accomplish this, the following routine may be carried out during any updates.

If the AP 150 requests an update it sets the rAvlShrBuf.update bit to 1 and reads the current value stored in the rAvlShrBuf value.

At this time TMA 100 stores the returned value in a temporary register and waits for the AP 150 to return the new value.

During this time the updates to the rAvlShrBuf occurs in the normal manner.

When the AP 150 returns the new value, and if the Update bit is set to 1, the TMA 100 performs the consolidation by finding the difference between the old saved value and the new value. The difference is added to the current value held in the rAvlShrBuf register.

Figure 6:
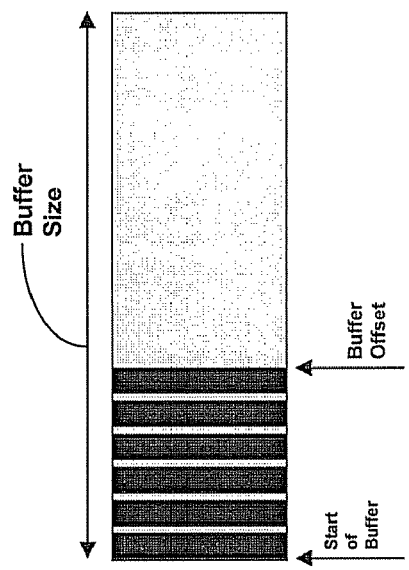
FIG. 6 is a diagram showing the pointers within a buffer.

FIG. 6 shows the pointers within a buffer. A buffer is defined to include consecutive locations in memory. Since media traffic is larger in nature, and usually transferred in large qualities, the buffer size could be a larger value (eg: 8 KB per buffer). For a larger number of bytes available per buffer, the number of pointers to be maintained (when considering a given overall memory size) is smaller. In order to keep track of the position within a buffer to which data are currently being stored, or from which data are currently being read, an Offset parameter is used. A head buffer offset, tail buffer offset and play head buffer offset are used respectively for all three types of buffer pointers.

Empty memory buffers available for future storage are contained in the Free Buffer Queue (FBQ). FIG. 7A shows an example of an FBP 700. The FBQ 700 is organized as a last-in, first-out (LIFO) stack. The FreeBufPtr points to the first free buffer available. An element of the FBQ consists of NextBufPtr and PrevBufPtr. The NextBufPtr location for a buffer points to the next buffer location in the linked list of buffers. The PreBufPtr points to the previous buffer in the linked list of buffers.

Figure 7B:
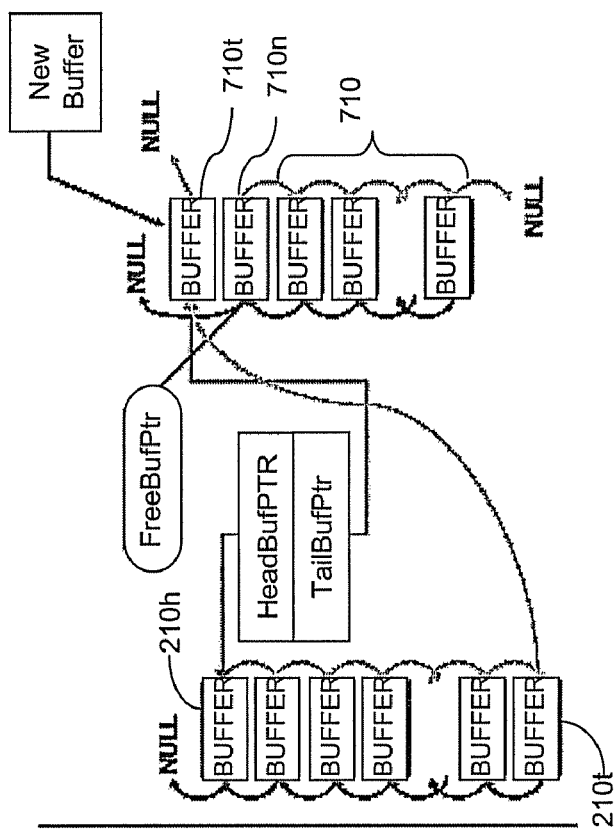
FIGS. 7A and 7B are diagrams showing how a new buffer is linked to an existing buffer chain.
Figure 7A:
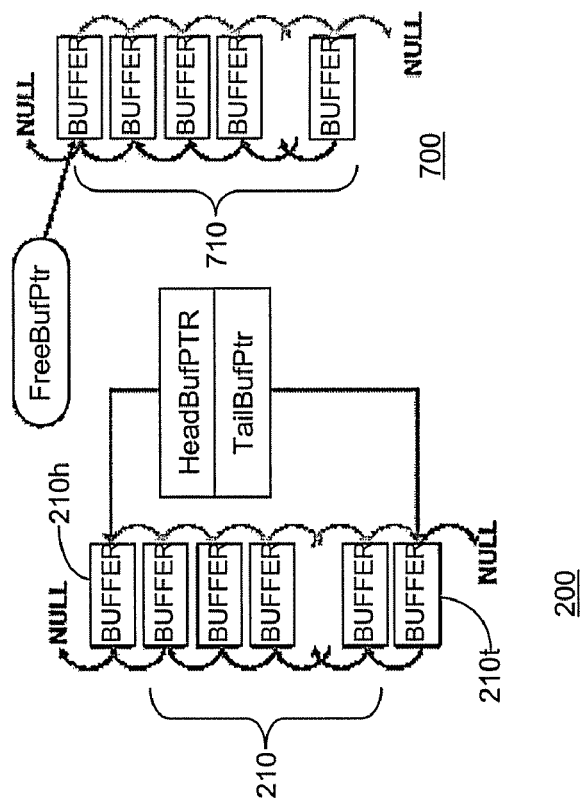

FIGS. 7A and 7B illustrate an example of how a new buffer is linked to an existing QID buffer chain, and the changes in the Free Buffer Pool. FIG. 7A shows the existing queue (buffer chain) 200, with individual buffers 210, a head (least recently used) buffer 210h and a tail buffer 210t (currently being written). The QID head buffer pointer (HeadBufPtr) points to head buffer 210h, and the QID tail buffer pointer (TailBufPtr) points to the tail buffer 210t. Also shown is the shared buffer area (free buffer pool) 700, including a linked list of free buffers 710, with a free buffer pointer (FreeBufPtr) pointing to the next available buffer.

FIG. 7B shows the existing queue 200 and the shared buffer area 700 after a buffer is allocated from the free buffer pool to the queue 200. The head buffer 210h remains the same. The next-buffer pointer of the buffer 210t is changed from "null" to the new buffer 710t in the shared area 700. The QID head buffer pointer (HeadBufPtr) continues to point to head buffer 210h, but the QID tail buffer pointer (TailBufPtr) points to the new tail buffer 710t. The free buffer pointer (FreeBufPtr) now points to the next available buffer 710n below the new tail buffer 710t. The previous-buffer pointer of buffer 710n is set to "null".

Session Queue Thresholds

The exemplary embodiment utilizes multiple thresholds per session, in order to carry out media streaming objectives.

The exemplary method isolates and protects multiple simultaneous streams, by providing resource guarantees and protects the resources from becoming depleted.

The exemplary transfers of data to disk are efficient without much overhead. This is accomplished by accumulating sufficient media data before transfer takes place.

Transfers of data from disk 141 may face certain delays, so sufficient data are buffered up, prior to sending any data to the media player on the network, in order to avoid under-filling. Data are continuously retrieved from disk when data in the memory are depleted. Retrieval requests are stopped, if there is more than sufficient data in the memory.

When streaming out from the disk array to the network, it is desired that some portion of the data that has been played out be kept in memory. This may be used to perform a short rewind operation (discussed below with reference to FIG. 19A) or any retransmissions. Once the save data exceed a certain threshold, the buffers can be de allocated so the resources (buffers) can be freed up for future use. This is described in greater detail below.

Buffer and Disk Access Manager

In some embodiments, a buffer and disk access manager includes the following main functions: Free Buffer Pool Management (FBM) 170, Re-assembly buffer and disk storage management (RBM) 172, Media playback buffer and disk retrieval management (PBM) 174, and Application processor access memory and disk access management (AMM) 176. The FMB 170 maintains a table of a linked list of buffers in memory, including free and used buffers. The FBM 170 supports up to N (e.g., N=8191) buffers. Each buffer holds a programmable number of bytes (e.g., 4096, or 8192 bytes) of data. The Buffer Pointer Table (rBufPtrTable) may include a Next buffer pointer (NextBufPtr) and a Previous buffer pointer (PrevBufPtr)

The FBM 170 also manages the Free Buffer Pointer (FreeBufPtr) in a register. The FreeBufPtr is updated as buffers are written in and cleared out of the memory 110. The FreeBufPtr is advertised to the entities requesting write access to memory.

In addition to managing the free buffer list, the FBM 170 also decides if a particular buffer allocation request is accepted by using a thresholding scheme described below with reference to FIGS. 4-6. If FMB 170 decides to accept such request it provides the free buffer pointer to the requesting sub block. On the other hand, if the request is not accepted, the grant signal is not asserted (by FBM 170) and the requesting sub-block discards the data. In some embodiments, FBM 170 performs the following type of actions within a timeslot:

One buffer allocation task for re-assembly phase 2 (writing data to shared memory)
One buffer allocation task for playback phase 2 (writing data to shared memory)
One buffer de-allocation task for re-assembly phase3 (reading from shared memory) In some embodiments, more than 1 de-allocation is done at once
One buffer de-allocation task for playback phase 3 (reading from shared memory)
one buffer allocation or one buffer de-allocation task for AP 150.

De-allocation of a Buffer for a Given QID

When the RBM 172 or PBM 174 requests de-allocation, the buffers to which the rBMQID[qid].HeadBufPtr points is deallocated. When the request is made by the ATM 176, any arbitrary buffer is deallocated. The following routine provides a common mechanism for both options. The QID and the Buffer Pointer are provided to the FBM 170 for this purpose.

Function DeallocateBuffer(i, StartPtr)
begin
   PrevPtr=rBufPtrTable[StartPtr].Prev;
   NextPtr=rBufptrTable[StartPtr].Next;
   if (PrevPtr!=NULL) rBufPtrTable [PrevPtr].Next=NextPtr;
   if (NextPtr!=NULL) rBufPtrTable [NextPtr].Prev=PrevPtr;
   rBufPtrTable[StartPtr].Prev=NULL;
   rBufPtrTable[StartPtr].Next=FreeBufPtr;
   FreeBufPtr=StartPtr;
   if (rBMQID[i].OccBuf>rBMQID[i].GurBuf) {
      // If the QID was utilising shared buffer—retain it to the shared pool
      rAvlShrBuf=rAvlShrBuf+1;
   }
   rBMQID[i].OccBuf=rBMQID[i].OccBuf−1;
   TotBufOcc=TotBufOcc−1;
end FIGS. 8A and 8B illustrate an example of how a buffer 210*h* is de-linked from an existing QID buffer chain 200, and the changes in the Free Buffer Pool 700.

Figures 8A, 8B:
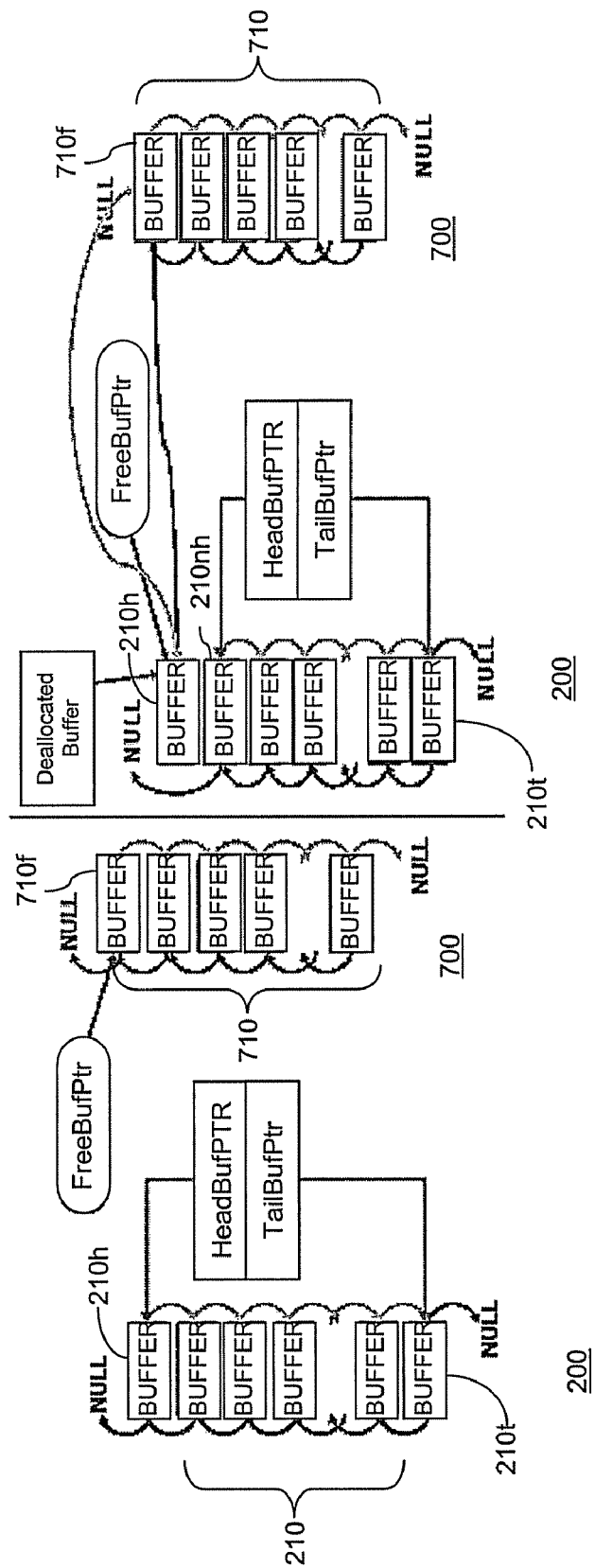
FIGS. 8A and 8B are diagrams showing de-allocation of a buffer.

FIGS. 8A and 8B show the changes to pointers when a buffer is deallocated. FIG. 8A shows the existing queue (buffer chain) 200, with individual buffers 210, a head buffer 210*h* and a tail buffer 210*t*. The QID head buffer pointer (HeadBufPtr) points to head buffer 210*h,* and the QID tail buffer pointer (TailBufPtr) points to the tail buffer 210*t*. Also shown is the shared buffer area 700, in which the free buffer pointer (FreeBufPtr) points to the next available buffer 710*f.*

FIG. 8B shows the queue 200 after deallocation of the head buffer 210*h*. The next buffer 210*nh* becomes the new head buffer. The buffer 210*h* is "pushed down" in the free buffer stack of shared area 700. The free buffer pointer (FreeBufPtr) is changed to point to buffer 210*h*. The previous-buffer pointer of buffer 710*f* is changed to point to buffer 210*h*. The next buffer pointer of buffer 210*h* is changed to point to buffer 710*f*. The following pseudocode shows these steps.

De-allocation of an Entire Buffer Chain

This function is used when all the buffers for a given QID are to be freed. This command is issued only by AP 150. In this case AMM 176 provides the QID and sets all the bits in the dqbuf signal to indicate the buffer chain deletion.

Figure 9:
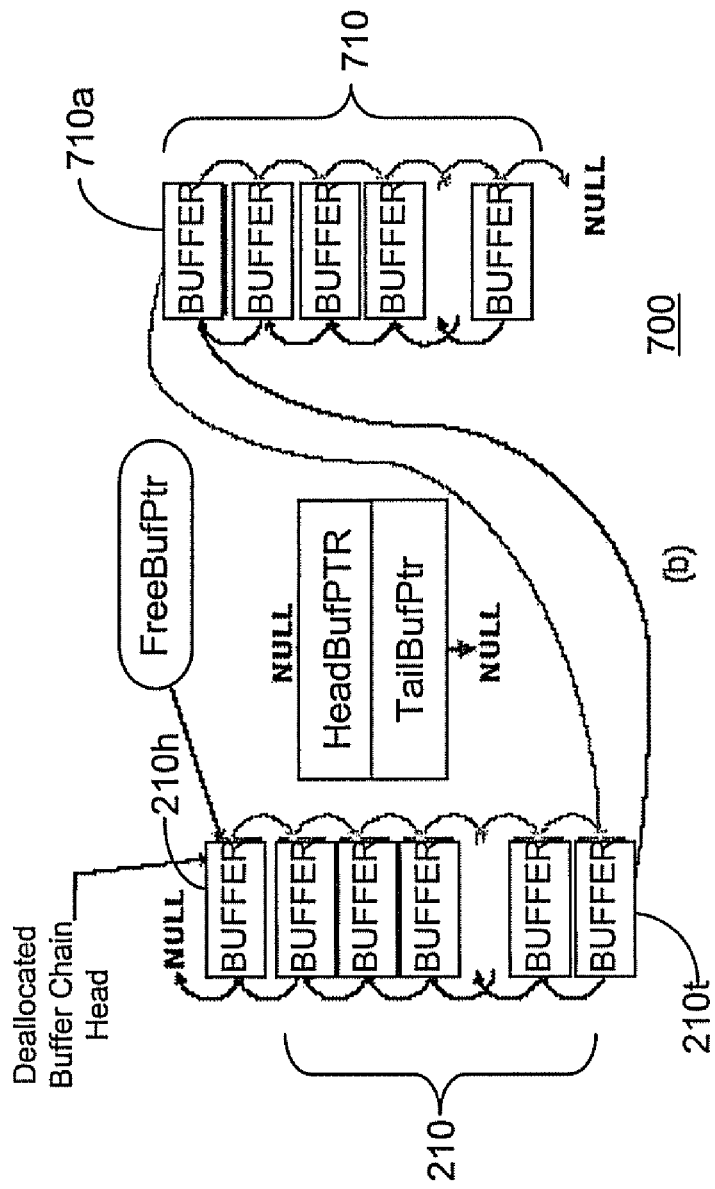
FIG. 9 is a diagram showing de-allocation of an entire buffer chain.

Function DeallocationBufferChain(i)
begin
   TempHeadPtr=rBMQID[i].HeadBufPtr;
   TempTailPtr=rBMQID[i].TailBufPtr;
   rBufPtrTable[TempheadPtr].Prev=NULL;
   rBufPtrTable[TempTailPtr].Next=FreeBufPtr;
   rBufPtrTable[FreeBufPtr].Prev=TempTailPtr;
   FreeBufPtr=TempHeadPtr;
   TotBufOcc=TotBufOcc−rBMQID[i].BufOcc;
   rBMQID[i].HeadBufPtr=NULL;
   rBMQID[i].PHeadBufPtr=NULL;
   rBMQID[i].TailBufPtr=NULL;
   if (rBMQID[i].OccBuf>rBMQID[i].GurBuf) {
      // If the QID was utilizing shared buffers—return them to the shared pool
      rAvlShrBuf=rAvlShrBuf+(rBMQID[i].OccBuf−rBMQID[i].GurBuf);
   }
   rBMQID[i].BufOcc=0;
end FIG. 9 illustrates an example of how the entire QID buffer chain 200 is de-allocated, and the changes in the Free Buffer Pool 700. The state of the buffer chain prior to the de-allocation is the same as shown in FIG. 7A, and a description thereof is not repeated. The deallocation of the queue (buffer chain) 200 is essentially a stack push of the buffers 210 down into a stack 700 of buffers 710.

In FIG. 9, the free buffer pointer (FreeBufPtr) is moved from the top of the shared area 700 to the first buffer 210*h* in the buffer 200 being deallocated. The next-buffer pointer of the tail buffer 210*t* is changed to point to the top buffer 710*a* of the free buffer stack 700 in the shared area. The previous-buffer pointer of the top buffer 710*a* of the free buffer stack 700 in the shared area is changed to point to buffer 210*t*. The head buffer pointer HeadBufPtr and tail buffer pointer TailBufPtr for that QID are both changed to "null".

Figure 10:
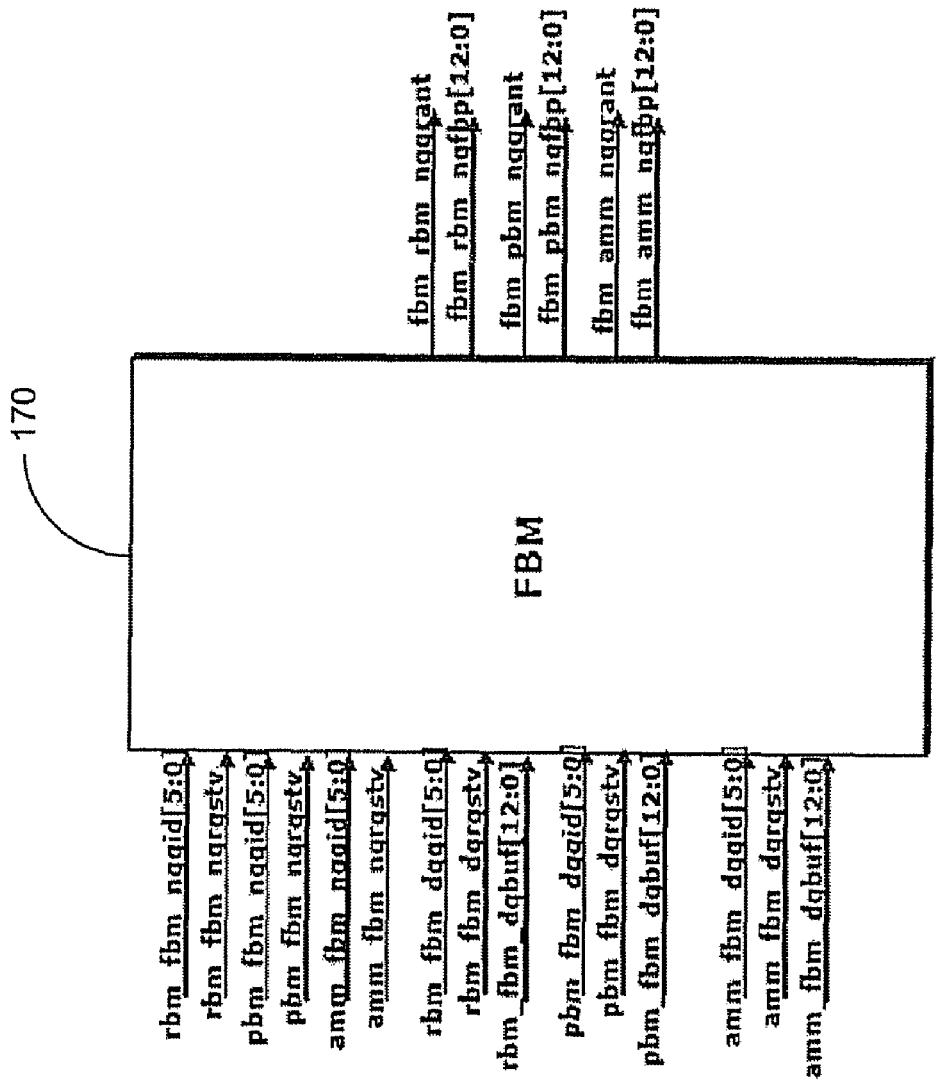
FIG. 10 is a data flow diagram showing signals received by and sent from the free buffer manager block shown in FIG. 1.

FIG. 10 is a data flow diagram showing the FBM block 170 and how it interfaces to the RBM 172, PBM 174 and the AMM 176. The description of the signals is provided in table 1.

TABLE 1

| Name | Bits | type | I/O | Description |
|---|---|---|---|---|
| rbm_fbm_nqqid[5:0] | 6 | bus | IN | Reassembly Enqueue QID. This bus indicates the QID that is being used to write data to the buffer memory. |

TABLE 1-continued

| Name | Bits | type | I/O | Description |
|---|---|---|---|---|
| rbm_fbm_nqrqstv | 1 | level | IN | Reassembly Enqueue Request Valid. This bit vali-dates the Enqueue QID indication. |
| fbm_rbm_nqgrant | 1 | level | OUT | Reassembly Enqueue Grant. When asserted it indicates that the write operation is allowed. When deasserted it indicates that the data cannot be written to memory and the packet is to be discarded. |
| pbm_fbm_nqqid[5:0] | 6 | bus | IN | Playback Enqueue QID. This bus indicates the QID that is being used to write data to the buffer memory. |
| pbm_fbm_nqrqstv | 1 | level | IN | Playback Enqueue Request Valid. This bit vali-dates the Enqueue QID indication. |
| fbm_pbm_nqgrant | 1 | level | OUT | Playback Enqueue Grant. When asserted it indicates that the write operation is allowed. When deasserted it indicates that the data cannot be written to memory and the packet is to be discarded. |
| amm_fbm_nqqid[5:0] | 6 | bus | IN | AAP Enqueue QID. This bus indicates the QID that is being used to write data to the buffer memory. |
| amm_fbm_nqrqstv | 1 | level | IN | AAP Enqueue Request Valid. This bit validates the Enqueue QID indication. |
| fbm_amm_nqgrant | 1 | level | OUT | AAP Enqueue Grant. When asserted it indicates that the write operation is allowed. When deasserted it indicates that the data cannot be written to memory and the packet is to be discarded. |
| rbm_fbm_dqqid[5:0] | 6 | bus | IN | RBM Dequeue QID. This bus indicates the QID that is being used to read data from the buffer memory. The FBM deallocates the buffer provided. |
| rbm_fbm_dqbuf[12:0] | 13 | bus | IN | RBM Dequeue Buffer. This bus indicates the buffer being deallocated. The FBM will reurn this buffer pointer to the free pool. |
| rbm_fbm_dqrqstv | 1 | level | IN | RBM Dequeue Request Valid. This bit validates the Dequeue QID indication. |
| pbm_fbm_dqqid[5:0] | 6 | bus | IN | PBM Dequeue QID. This bus indicates the QID that is being used to read data from the buffer memory. The FBM will reurn this buffer pointer to the free pool. |
| pbm_fbm_dqbuf[12:0] | 13 | bus | IN | PBM Dequeue Buffer. This bus indicates the buffer being deallocated. The FBM will reurn this buffer pointer to the free pool. |
| pbm_fbm_dqrqstv | 1 | level | IN | PBM Dequeue Request Valid. This bit validates the Dequeue QID indication. |
| amm_fbm_dqqid[5:0] | 6 | bus | IN | AAP Dequeue QID. This bus indicates the QID that is being used to read data from the buffer memory. The FBM will reurn this buffer pointer to the free pool. |
| amm_fbm_dqbuf[12:0] | 13 | bus | IN | AMM Dequeue Buffer. This bus indicates the buffer being deallocated. The FBM will reurn this buffer pointer to the free pool. If all the bits are set to 1, then the entire chain is deallocated. |
| amm_fbm_dqrqstv | 1 | level | IN | AAP Dequeue Request Valid. This bit validates the Dequeue QID indication. |

The above-described embodiment provides a queue structure with multiple thresholds, efficient empty and refill policies targeted for storage drives, a thresholding scheme for fair priority based admission of data to queue, and a deallocation scheme that enables trick play functions for media streams. The queuing architecture has multiple uses. The thresholding scheme provides fair access to buffer resources. The pointer management techniques described above enable high disk bandwidth utilization and network streaming without underflowing.

Controlled Accesses of Media and Processor Specific Streams to/from Disk

In the home media server 10, multiple streams are stored to disk 141 or played out from disk 141. In addition AP 150 accesses the disk 141. A method is described below to manage disk access bandwidth in a controlled and a fair manner to prevent any of the sessions from becoming starved for disk bandwidth.

An exemplary embodiment described below provides a mechanism to find the most eligible storage session and retrieval session for every scheduling opportunity. This selection is based on buffer occupancy level of the session and a programmed weight. This embodiment provides a bandwidth control structure and algorithm, to fairly distribute bandwidth based on the programmed bandwidth requirements among storage sessions, playback sessions and control traffic.

In some embodiments, a method comprises assigning each of a plurality of disk write and disk read requests to respective ones of a plurality of queues. Each queue has an occupancy level and a weight. A score is assigned to each of the plurality of queues, based on the occupancy and weight of the respective queue. An operation type is selected to be granted a next disk access. The selection is from the group consisting of disk write, disk read, and processor request. One of the queues is selected based on the score assigned to each queue, if the selected operation type is disk write request or disk read request. The next disk access is granted to the selected operation type and, if the selected operation type is disk write or disk read, to the selected queue.

The exemplary disk management method has multiple advantages. The "real-time" software processes that require access to the disk are not stalled by the underlying hardware.

The software operation can take place while concurrent media read/write operations are taking place. Media object playback read requests, application processor read and write to disk requests, re-assembled media object write requests compete for bandwidth to the disk 141. These requests are arbitrated and access guarantees are met using a Disk Access Scheduler (DAS) 182.

Figure 14:
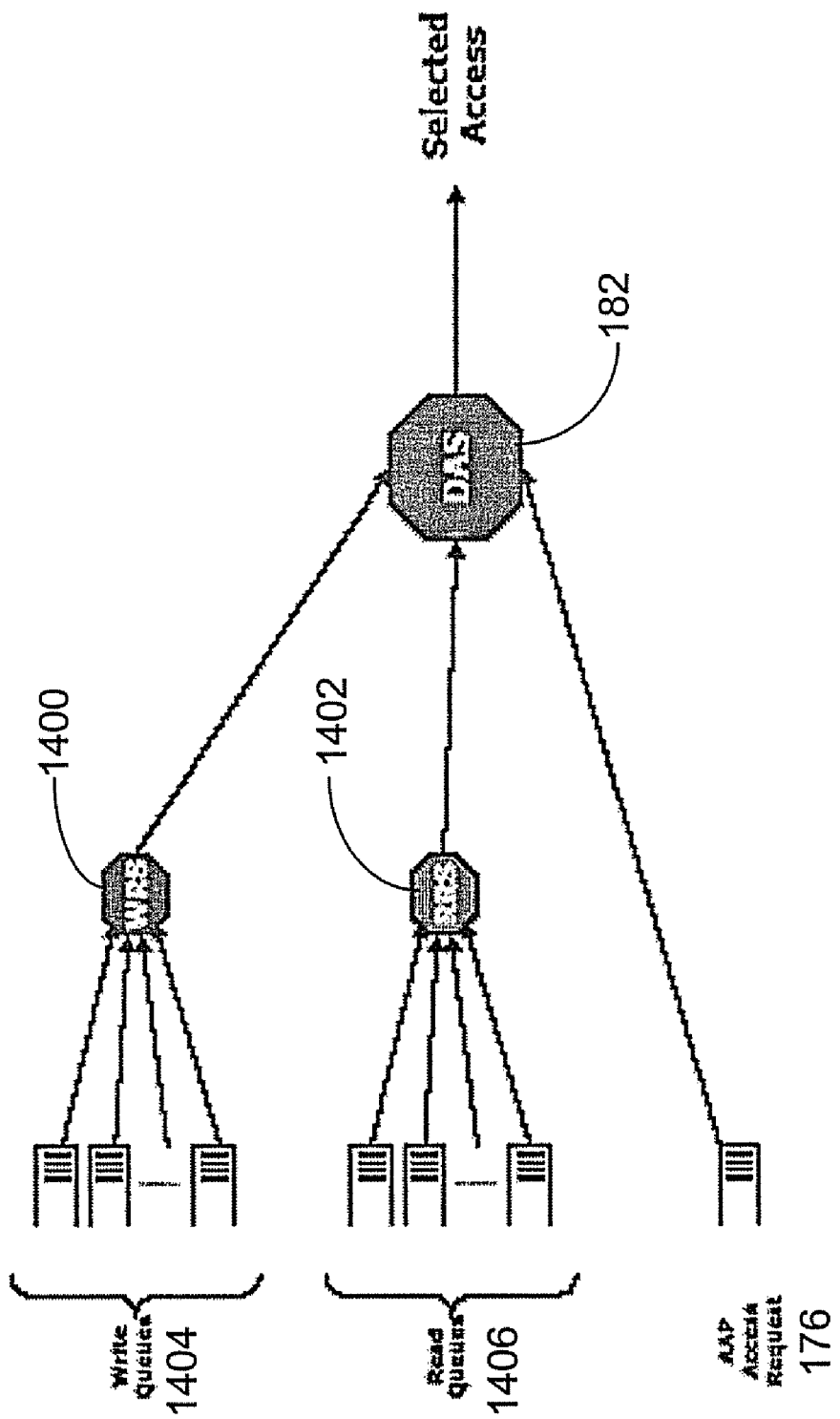
FIG. 14 is a block diagram of the disk access scheduler of FIG. 1.

FIG. 14 is a block diagram of an exemplary disk access scheduler 182.

The disk accesses from three contending sources (RMB 172, PBM 174 and AMM 176) are weighted. A write request scheduler (WRS) 1400 processes the write requests from RBM 172, A read request scheduler (RRS) 1402 processes the read requests from PBM 174. In DAS 182, disk access requests from WRS 1400, RRS 1402 and AMM 176 are alternately scheduled. A simple deficit weighted round robin algorithm takes transfer sizes into account for this purpose.

Figure 15:
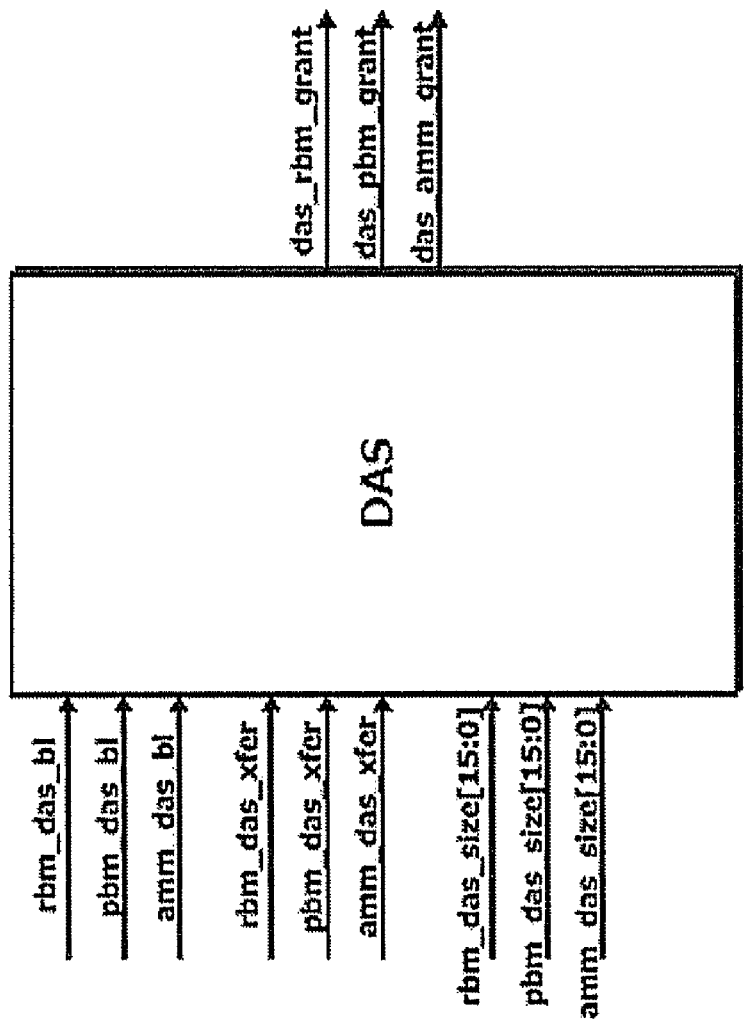
FIG. 15 is a data flow diagram showing signals received by and sent from the disk access scheduler block shown in FIG. 14.

FIG. 15 is a data flow diagram for DAS 182.

The DAS 182 maintains a backlog indicator for each of three types of requests corresponding to the three receptors, RBM 172, PBM 174 and AMM 176. Backlog indicators RBM_das_bl, PBM_das_bl, and AMM_das_bl indicate whether there are pending requests from RBM 172, PBM 174 and AMM 176, respectively. If the backlog bit is set to one, then the request type is considered for the scheduling decision.

Transfer indicators RBM_das_xfer, PBM_das_xfer, and AMM_das_xfer indicate that data are being transferred from RBM 172, PBM 174 and AMM 176, respectively. Size indicators RBM_das_size, PBM_das_size, and AMM_das_size indicate the size of data transferred from RBM 172, PBM 174 and AMM 176, respectively. Grant signals RBM_das_grant, PBM_das_grant, and AMM_das_grant are sent to RBM 172, PBM 174 and AMM 176, respectively, when each is granted disk access.

Figure 11:
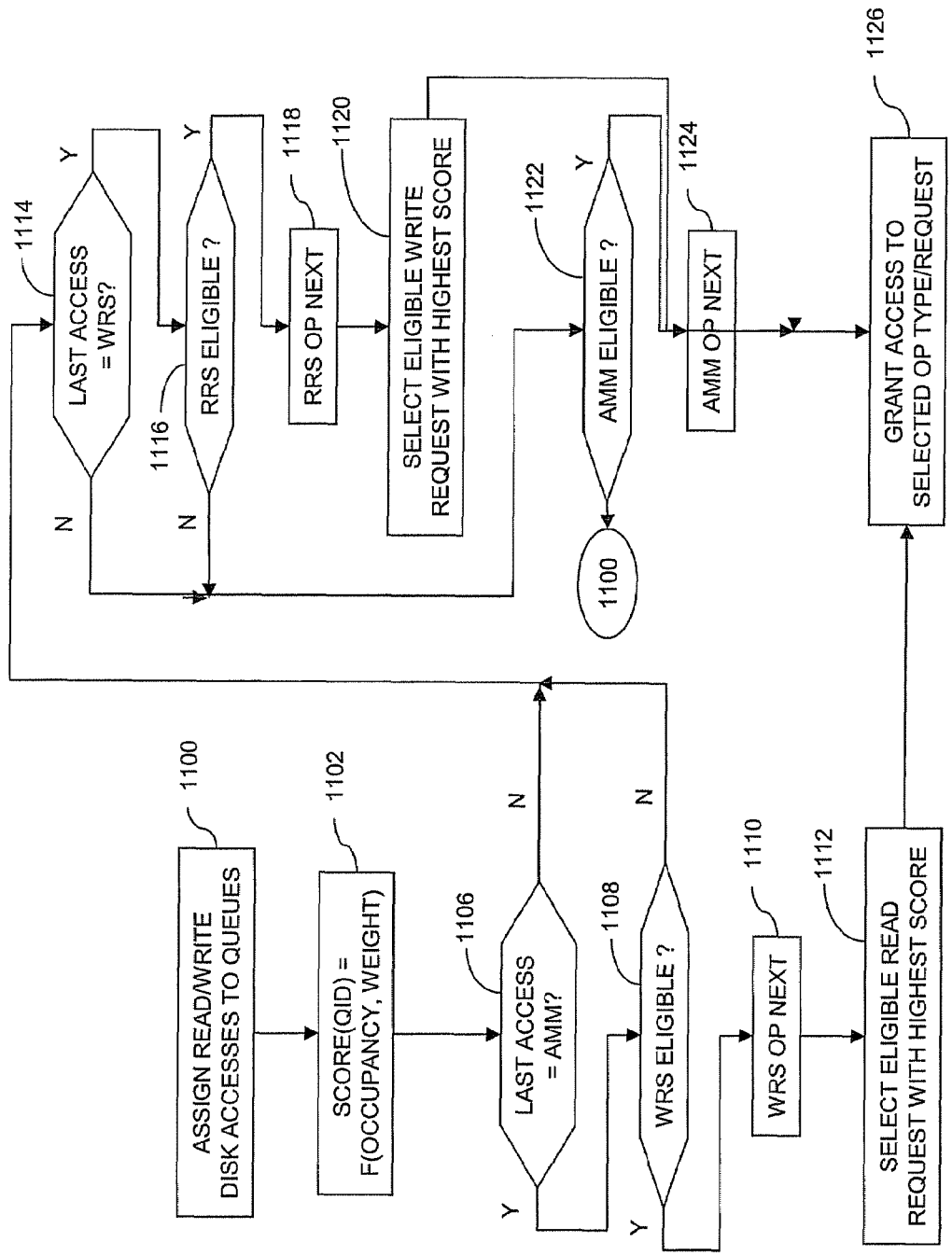
FIG. 11 is a flow chart showing operation of the disk access scheduler of FIG. 1.

FIG. 11 is a flow chart of an exemplary deficit weighted round robin algorithm.

At step 1100, the read and write disk access requests are all assigned to respective buffer queues.

At step 1102, each QID is assigned a respective score based on a function of the queue occupancy and a weight associated with the application type for that request.

At step 1106, DAS 182 determines whether the last access was granted to the AMM 176. If the last access was granted to AMM 176, step 1108 is executed. If not, step 1114 is executed.

At step 1108, DAS 182 determines whether WRS 1400 is currently eligible for disk access. The eligibility criterion is discussed below with reference to FIG. 13. If WRS 1400 is eligible for disk access, step 1110 is executed. If not, step 1114 is executed.

At step 1110, DAS 182 selects WRS 1400 to receive the next disk access operation.

At step 1112, WRS 1400 selects the pending write request that is eligible for disk access and has the highest score, using criteria discussed below with respect to FIG. 12. Then step 1126 is executed.

At step 1114, DAS 182 determines whether the last access was granted to the WRS 1400. If the last access was granted to WRS 1400, step 1116 is executed. If not (i.e., the last access was neither granted to WRS 1400 or RRS 1402), step 1122 is executed.

At step 1116, DAS 182 determines whether RRS 1402 is currently eligible for disk access. The eligibility criterion is discussed below with reference to FIG. 13. If RRS 1402 is eligible for disk access, step 1118 is executed. If not, step 1122 is executed.

At step 1118, DAS 182 selects RRS 1402 to receive the next disk access operation.

At step 1122, RRS 1402 selects the pending read request that is eligible for disk access and has the highest score, using criteria discussed below with respect to FIG. 12. Then step 1126 is executed.

At step 1122, DAS 182 determines whether AMM 176 is currently eligible for disk access. The eligibility criterion is discussed below with reference to FIG. 13. If AMM 176 is eligible for disk access, step 1124 is executed. If not, step 1100 is executed.

At step 1124, DAS 182 selects AMM 176 to receive the next data access operation.

At step 1126, DAS 182 issues the grant signal to the selected requestor.

The Re-Assemble Media Write and Playback Media Read requests are determined based on the buffer occupancy levels and the relative priorities among the queues. When the OccBuf value goes above the XferTH, or when the end of an object is present in the buffer, a session becomes eligible for a disk write operation, during a re-assembly process, and when the OccBuf value goes below the DRqstTH value for a given session, it becomes eligible for a disk read operation during a playback process.

Each one of the queue IDs is assigned a weight (e.g., 1, 2, 3 or the like). In some embodiments, each process has its own unique weight and an occupancy level (number of buffers used). For writing data to disk, the disk access is given to the session for which the product of the weight multiplied by the occupancy is greatest. For example, in the case of the Write Request Scheduler (WRS) 1400 first the occupancy level is multiplied by the weight. That provides a score for that particular queue. The queue that has the highest score wins out. Essentially, processes that are using up a lot of buffers need to get the data to the disk first so that their buffers do not overflow (reach to the max buffer threshold). So the session that is hogging the buffers and has the highest weight receives the access. If a session has a very high weight, that session may get the disk access even with a low buffer occupancy.

For example, video sessions may be assigned a higher weight than music sessions because music files are shorter, and video files are longer.

Thus, in the case of re-assembly, the longer queues and the higher weights are given priority over shorter queues and low weight queues. The product of weight and the queue level determines the selection score for a queue. The QID with the maximum score is selected for service. In some embodiments, this part of the scheduler may be implemented in the RBM 172. In other embodiments, the function may be performed by DAS 182.

In the case of playback, the shorter queues (with lower occupancy) and those with higher weights are given priority over longer queues and high-weight queues. The product of weight and the inverse of the queue occupancy level determines the selection score for a queue. In order to avoid a division operation, the weights for the playback queues are set up inversely proportional to the priority (i.e., lower weight means higher priority). The selection score is determined by multiplying queue length by the programmed weight. The queue with the minimum score is selected for service. This part of the scheduler is implemented in the PBM 174.

In the Read Request Scheduler (RRS) 1402 it is desirable to get data from the disk for the queue that is running out of data first. So if a user is watching a movie and the data are not in the memory then the user can see a gap in the movie. So for playback, the concept is whichever session has the least amount of data needs to get access to the disk first, so the weighting works differently from that in the storage sessions.

The Deficit Weighted Round Robin Scheduling used in DAS 182 guarantees weighted service opportunities to each of the request types.

Write Request Scheduler (WRS)

WRS 1400 selects the QID that should get the disk write access at a given time, based on the assigned weight to the QID, the buffer occupancy level of the QID. The algorithm is described below with the aid of the following pseudocode.

```
// continuously update the DAS Eligible per QID on new buffer
allocation or deallocation
i = QID; //QID that has undergone buffer chain update
if ((rBMQID[i].OccBuf > rBMQID[i].XferTH OR
    rBMQID[i].EOB==TRUE) AND rBMQID[i].StorageEn == 1) {
    WRSEligible[i] = 1;
}
else {
    WRSEligible[i] = 0;
}
Function SearchWRS( );
begin
    SCORE = 0; //
    Found = FALSE;
    for (k = 0; k < 64; k++) {
        if ((WRSEligible[k] == 1) {
            QIDSCORE = rBMQID[k].OccBuf * rDMQID[k].Weight;
            if (QIDSCORE > SCORE) {
                SEL_QID = k;
                Found = TRUE;
                SCORE = QIDSCORE;
            }
        }
    }
    if (Found == TRUE) {
        WRS_QID = SEL_QID;
    }
    else {
        WRS_QID = NULL;
    }
end
```

When a request queue is selected, the selection indication is provided to the appropriate block. The blocks use the internal state information to determine which QID to grant access. Using this as the index, the disk access information is looked up in the rDMQID register in the case of Media accesses and the rAPDM register in the case of an AP access. The values in the registers are used to formulate a transfer request to RDE 140. This process is described above. The interfaces to the DAS scheduler sub-block is illustrated in FIG. 11 and the signals are described in table 2 below.

TABLE 2

| Name | Bite | type | I/O | Description |
|---|---|---|---|---|
| rbm_das_bl | 1 | level | IN | RBM Backlog. This signal indicates that there is atleast one QID that requires a disk write access. |
| pbm_das_bl | 1 | level | IN | PBM Backlog. This signal indicates that there is atleast one QID that requires a disk read access. |
| amm_das_bl | 1 | level | IN | AMM Backlog. This signal indicates that there is a pending disk read/write request by the APP. |
| rbm_das_xfer | 1 | level | IN | RBM Transfer in Progress. This signal indicates that there is an ongoing disk write operation. The DAS does not grant access to anyone at this time. |
| pbm_das_xfer | 1 | level | IN | PBM Transfer in Progress. This signal indicates that there is an ongoing disk write operation. The DAS does not grant access to anyone at this time. |
| amm_das_xfer | 1 | level | IN | AMM Transfer in Progress. This signal indicates that there is a ongoing disk read/write operation by the APP. The DAS does not grant access to anyone at this time. |
| rbm_das_size[15:0] | 16 | bus | IN | RBM Transfer Size. This bus indicates the size of the disk write operation in sectors. This is provided at the beginning of the transfer along with rbm_das_xfer. |
| pbm_das_size[15:0] | 16 | bus | IN | PBM Transfer Size. This bus indicates the size of the disk read/write operation in sectors. This is provided at the beginning of the transfer along with pbm_das_xfer. |
| amm_das_size[15:0] | 16 | bus | IN | AMM Transfer Size. This bus indicates the size of the disk read/write operation in sectors. This is provided at the beginning of the transfer along with amm_das_xfer. |
| das_rbm_grant | 1 | level | OUT | RBM Access Grant. This signal indicates that the RBM can perform a disk write operation. |
| das_pbm_grant | 1 | level | OUT | PBM Access Grant. This signal indicates that the PBM can perform a disk write operation. |
| das_amm_grant | 1 | level | OUT | AMM Access Grant. This signal indicates that the AMM can perform a disk write operation. |

Figure 12:
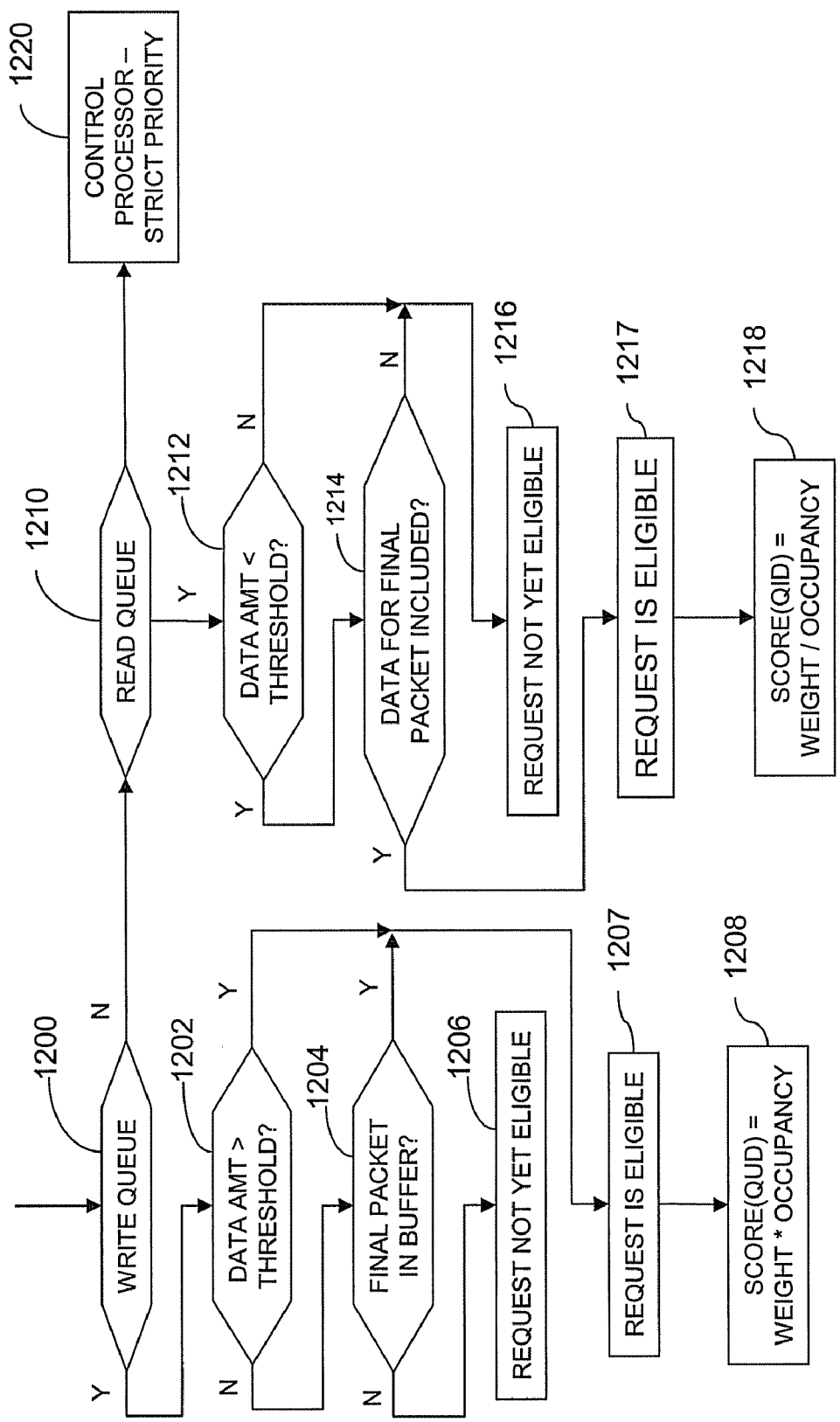
FIG. 12 is a flow chart showing operation type scoring within the method of FIG. 11.

FIG. 12 illustrates the high level scheduling structure of DAS 182. This figure includes components from RBM 172, PBM 174, AMM 176 and DAS 182.

Once DAS 182 selects the type of operation to perform to disk 141, it provides access grants to RBM 172 in case of a write, PBM 174 in the case of a read and AMM 176 in the case of an AP access. The RBM 172 or PBM 174 selects the appropriate queue to select based on the queue occupancy level and the priority specified by the weight of the QID.

If any one of the QIDs is eligible for disk access, the rbm_das_bl signal is asserted.

FIG. 12 shows (in steps 1200 to 1208) the high level functions of an exemplary WRS 1400.

At step 1200, if a request is a write access request from RMB 172, then step 1202 is performed. If not, then step 1210 is performed (discussed below with reference to the RRS 1402).

At step 1202, WRS 1400 determines whether a pending write request includes an amount of data already in buffers 210 in memory 110 greater than a threshold value. If the amount of data is greater than the threshold, step 1207 is executed. If not, step 1204.

At step 1204, WRS 1400 determines whether the final packet of the pending data transfer is already stored in buffers 210 in memory 110. If the final packet is in the buffer, step 1207 is executed. If not, step 1206 is executed.

At step 1206, the pending request is not yet eligible for writing to the disk. The WRS will re-evaluate the request later, to determine whether it is ready for writing to disk (i.e., whether the final packet has been placed in a buffer).

At step 1207, the WRS 1400 sets the request eligible bit for this request.

At step 1208, the score of the write request is determined based on the weight of the QID times the occupancy level of the buffers in the queue for that QID. This scoring gives preference to write requests with high weights and high buffer occupancy.

Read Request Scheduler (RRS)

RRS 1402 selects the QID that should receive the disk read access at a given time, based on the assigned weight to the QID and the buffer occupancy level of the QID. In order to simplify the search operation, the weight programmed (Weight) may be the inverse of the desired weight.

FIG. 12 (at steps 1210 to 1218 show certain functions of the RRS 1402.

At step 1210, if the pending request is a read request, steep 1212 is executed. If not (i.e., if it is a control processor request), step 1220 is executed.

At step 1212, RRS 1402 determines whether the amount of data to be transferred by the read request is less than a threshold value. If the data amount is less than the threshold value, step 1214 is executed. If not, then step 1216 is executed.

At step 1214, RRS 1402 determines whether the data for the final packet (end of object) of the data transfer will be transferred as a part of servicing the request. If the end of the object is included, step 1217 is executed. If not, step 1216 is executed.

At step 1216, the request eligible bit is reset to indicate that the request is not eligible to receive disk access.

At step 1217, the request eligible bit si set to indicate that the request is eligible to receive disk access.

At step 1218, the RRS 1402 calculates the scope of the request based on the weight of the QID divided by the buffer occupancy.

At step 1220, if the request is neither a write request from RBM 172 or a read request from PBM 174, then the request is a control processor request from AMM 176.

An exemplary embodiment of the algorithm is described by the pseudocode below.

```
// continuously update the DAS Eligible per QID on new buffer allocation
or deallocation
i = QID; //QID that has undergone buffer chain update
if (rBMQID[i].OccBuf < rBMQID[i].DRqstTH AND rBMQID[i].EOB ==
    FALSE AND rBMQID[i].RetrievalEn == 1) {
    RRSEligible[i] = 1;
}
else {
    RRSEligible[i] = 0;
}
Function SearchWRS( );
begin
    SCORE = MAX; //MAX is the largest possible value
    Found = FALSE;
    for (k = 0; k < 64; k++) {
        if ((RRSEligible[k] == 1) {
        QIDSCORE = rBMQID[k].OccBuf * rDMQID[k].Weight;
            if (QIDSCORE < SCORE) {
                SEL_QID = k;
                Found = TRUE;
                SCORE = QIDSCORE;
            }
        }
    }
    if (Found == TRUE) {
        RRS_QID = SEL_QID;
    }
    else {
        RRS_QID = NULL;
    }
end
```

If any one of the QIDs is eligible for disk access, the pbm_das_bl signal is asserted.

Transfer of Data from Disk to Memory

AP 150 accesses applications and meta-data stored in the control portion of the disk 141. This process does not utilize the QID queues. In order to accomplish this the data from memory 110 are loaded into the shared memory, and the data is used by the AP 150.

The AP 150 specific disk access use a single request, and at most one request can be outstanding. The disk access data and shared memory address location are stored in the rDMAAP register.

Transfer of Data from Memory to Disk

The AP 150 would require transfer of data stored in memory to disk after processing data in the memory. This process does not utilize the QID queues.

Reading Data from a QID Buffer Chain

This feature enables AP to inspect the packet data stored in buffers, and obtain necessary information about a connection. When such action is needed the AP populates the rAPQIDRd command register with the necessary information. This read operations do not modify the data or head and tail pointers associated with the buffer chain.

The PHeadBufPtr is updated to track the position within the chain. When the AP command register is populated.

Writing Data to a QID Buffer Chain

This feature enables AP to append data bytes to an existing packet stream. This is necessary during packet reordering.

In addition, it may also be necessary to insert packets to be forwarded to the HNI port. When such action is needed the AP populates the rAPQIDWr command register with the necessary information. The new data is always added to the tail and this write operations modify some pointers associated with the buffer chain.

DAS Operations

When DAS 182 is eligible to serve a request (WRS 1400, RRS 1402 or AP 150), it executes the DAS Search routine. If there is an ongoing transfer, DAS 182 does not perform a search until the transfer is about to complete (i.e, only the last search result before the completion of transfer is valid). When the transfer is completed (via a the xfer signal), DAS 182 uses the latest search result, and grants access to the appropriate request type. Independently, WRS 1400 in RMB 172 and RRS 1402 in PBM 174 selects the candidate to serve. Once DAS 182 determines the type of request serve, it grants access to the QID selected by RRS 1402, WRS 1400 or AP 150.

Figure 13:
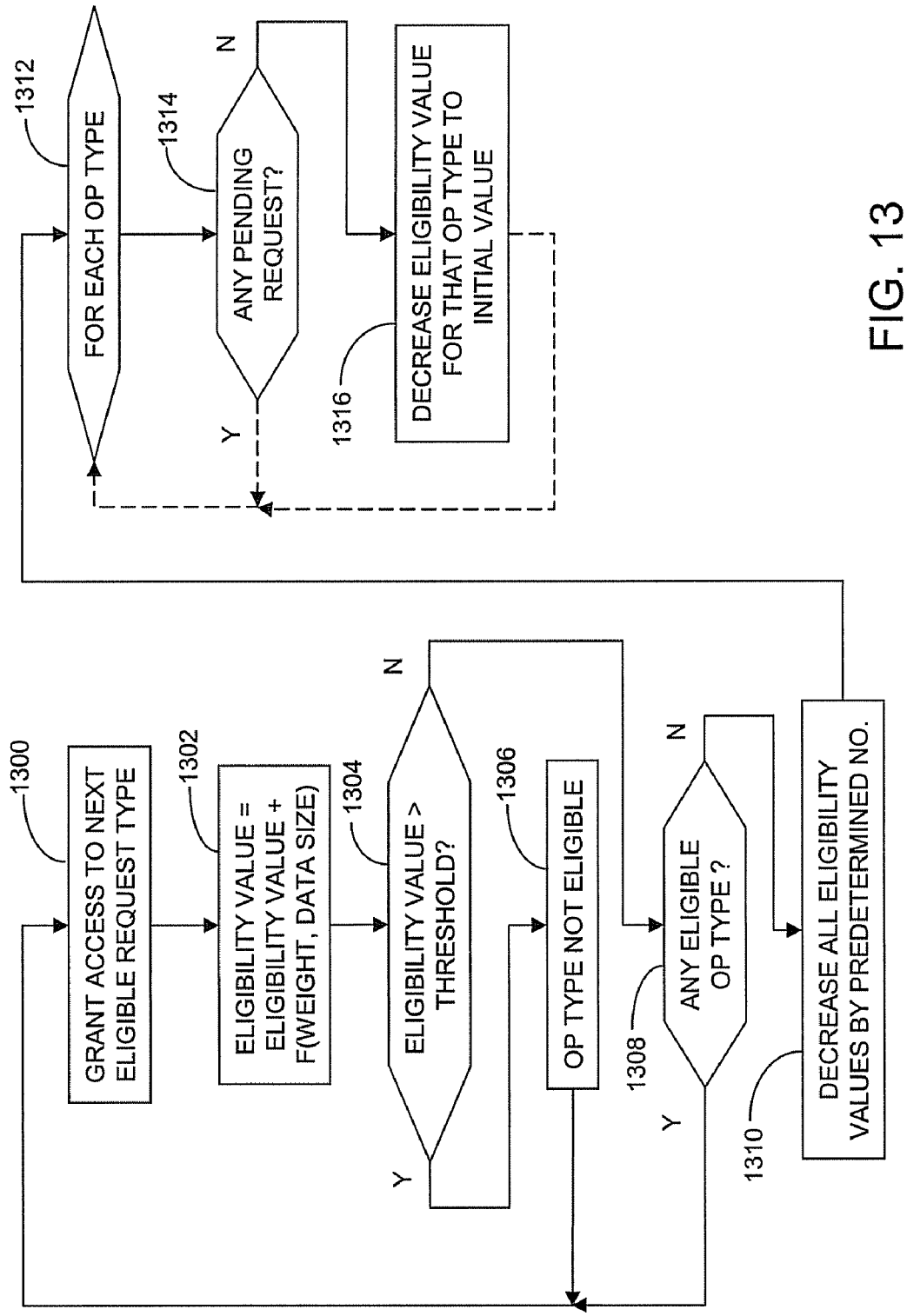
FIG. 13 is a flow chart showing eligibility determination within the method of FIG. 11.

FIG. 13 is a flow chart diagram of an exemplary round robin method.

At step 1300, the DAS 182 grants disk access to the next eligible request type.

At step 1302, the eligibility value (referred to in the pseudocode below as "timestamp") of the operation type is increased by an amount that is a function of the weight and the data size of the pending request for that QID.

At step 1304, DAS 182 determines whether the eligibility value for the operation type is greater than a threshold value rDAS.MAXDAS. If the eligibility value is greater than the threshold, step 1306 is executed. If the eligibility value is not greater than the threshold rDAS.MAXDASTS, step 1308 is executed.

At step 1306, because the eligibility value for the operation type is greater than a threshold value rDAS.MAXDASTS, this operation type is not eligible for disk access, and will not be eligible until the eligibility values for the other two operation types also reach rDAs.MAXDASTS. This prevents one operation type from monopolizing the disk access, and ensures that over a relatively long period of time, all three operation types have approximately equal access to the disk. After step 1306, the access is granted to the next eligible operation type.

At step 1308, when the eligibility value for the operation type under consideration is greater than rDAS.MAXDASTS, DAS 182 determines whether any of the operation types is eligible to receive disk access. If one or both of the other operation types is eligible, then step 1300 is executed. If none of the operation types is currently eligible to receive disk access (i.e., if the eligibility values for all of the operation types are greater than rDAS.MAXDASTS, then step 1310 is executed.

At step 1310, DAS 182 decreases the eligibility values of all of the operation types by a predetermined number (e.g., by an amount equal to rDAS.MAXDASTS).

At step 1312, a loop including steps 1314 and 1316 is repeated for all three of the operation types.

At step 1314, DAS 182 determines whether each operation type has at least one pending request. If the operation type has a request, step 1316 is skipped.

At step 1316, for an operation type that has no pending request, DAS 182 further reduces the eligibility value of that operation type to its initial value (e.g., zero).

The search process below is executed every timeslot. If there is an ongoing transfer the result is ignored. Once there are no ongoing transfers (all the xfer signals are de-asserted), the search result is utilized to provide the grant.

```
Function SearchDAS( )
begin
      WRSBL = rbm_das_bl;
      RRSBL = pbm_das_bl;
      AAPBL = amm_das_bl;
      Sel_Acc = NULL;
      // Create an eligibility bitmap. If the timestamps are not above the MAXDASTS
      // and there is backlog then the request type is eligible.
      if (rDAS.WRSTS < rDAS.MAXDASTS AND WRSBL == TRUE) {
            DASELIGIBLE[0] = TRUE;
      }
      if (rDAS.RRSTS < rDAS.MAXDASTS AND RRSBL == TRUE) {
            DASELIGIBLE[1] = TRUE;
      }
      if (rDAS.AAPTS < rDAS.MAXDASTS AND AAPBL == TRUE) {
            DASELIGIBLE[2] = TRUE;
      }
      // Find the service request to serve starting at the NextRqst pointer
      // NextRqst pointer is pointer that identifies where to start the next search
            phase
      if (NxtRqst == 0) {
            if (DASELIGIBLE[0] == TRUE) { // pointer is at 0 and WRS can be served
                  Sel_Acc == WRSAcc;
            }
            else if (DASELIGIBLE[1] == TRUE) {// pointer is at 0 but WRS cannot be
                              // served,so try to serve RRS
                  Sel_Acc == RRSAcc;
            }
            else if (DASELIGIBLE[2] == TRUE) {// pointer is at 0 but WRS/RRS cannot
                              // be served so try to serve AAP
                  Sel_Acc == AAPAcc;
            }
      }
      else if (NxtRqst == 1) {
            if (DASELIGIBLE[1] == TRUE) {
                  Sel_Acc == RRSAcc;
            }
            else if (DASELIGIBLE[2] == TRUE) {
                  Sel_Acc == AAPAcc;
            }
```

-continued

```
        else if (DASELIGIBLE[0] == TRUE) {
            Sel_Acc == WRSAcc;
        }
    }
    else if (NxtRqst == 2) {
        if (DASELIGIBLE[2] == TRUE) {
            Sel_Acc == AAPAcc;
        }
        else if (DASELIGIBLE[0] == TRUE) {
            Sel_Acc == WRSAcc;
        }
        else if (DASELIGIBLE[1] == TRUE) {
            Sel_Acc == RRSAcc;
        }
    }
end
```

Once the search is completed, the requested access type is granted service when needed. Once the service is granted the Timestamp for the requester is updated as follows. The size info is provided via the size bus from various blocks.

if (Sel_Acc==AAPAcc) {
    rDAS.AAPTS=rDAs.AAPTS+rDAs.AAPWeight+am-m_das_size;
    NxtRqst=0; // Next time start the search from WRS
}
else if (Sel_Acc==WRSAcc) {
    rDAS.WRSTS=rDAS.WRSTS+
      rDAs.WRSWeight*rbm_das_size;
    NxtRqst=1; // Next time start the search from RRS
}
else if (Sel_Acc==RRSAcc) {
    rDAS.PRSTS=rDAS.RRSTS+
      rDAS.PRSWeight*pbm_das_size;
    NztRqst=2; // Next time start the search from AAP
}

The timestamps are continuously updated until they are above the MAXDASTS. At this point the request type is no longer eligible to be serviced since it has used up its bandwidth. When all the request types are under this condition, then a new service frame is started. At this point, all the request type timestamps are adjusted. The excess usage of bandwidth is recorded by adjusting the timestamps accordingly.

The new service frame is started even though a particular request type may not have used up its bandwidth, however, it does to have any backlog. So any of the bandwidth it did not use is lost.

// Update the TS if the TS is above MAXDASTS. Start a new service frame
if   ((rDAS.AAPTS<=rDAS.MAXDASTS   OR AAPBL==FALSE) AND
(rDAs.WRSTS<=rDAS.MAXDASTS   OR WRSBL==FALSE) AND
(rDAS.RRSTS<=rDAS.MAXDASTS   OR RRSBL==FALSE) {
  if            (rDAS.AAPTS<rDAG.MAXDASTS) rDAS.AAPTS=rDAS.AAPTS-rDAS.MAXDASTS;
  if (AAPBL==FALSE) rDAs.AAPTS=0;
  if            (WRSTS>rDAs.MAXDASTS) rDAS.WRSTS=rDAS.WRSTE=rDAS.MAXDASTS;
  if (WRSBL==FALSE) rDAS.WRSTS=0;
  if            (RRSTS>rDAS.MAXDASTS) rDAs.RRSTS=rDAS.RRSTS-rDAS.MAXDASTS;
  if (RRSBL==FALSE) rDAG.RRSTS=0;
}

Multi-session Live TV PVR Application

In some embodiments, the PBM 174 provides a live TV—personal video recorder (PVR) function.

Data Storage Flow

Data received at the GbE 131 or USB interface 130 for storage in the HDD 141 uses the DDR2 memory 110 to buffer data until written to the HDD. The TMA 100 controls data access to the DDR2 memory 110 and the HDD 141. The TMA 100 provides schedulers and buffer managers to efficiently and fairly store data from the network onto the HDD 141, as described above. FIGS. 17A-17C are block diagrams showing the storage data flows. All data flow in network attached storage system uses the DDR2 memory 110 for temporary storage.

FIG. 17A shows the data flow for storing data received from the Ethernet 131. The storage operation includes a first data flow from Ethernet 131 through ULP accelerator 120 to TMA 100, a second flow from TMA 100 to buffers in memory 110, a third flow from buffers in memory 110 to TMA 100, and a fourth flow from TMA 100 to RDE 140.

FIG. 17B shows the data flow for storing data received from the USB port 130. The storage operation includes a first data flow from USB port 130 to ULP accelerator 120, a second flow from ULP accelerator 120 to TMA 100, a third flow from TMA 100 to buffers in memory 110, a fourth flow from buffers in memory 110 to TMA 100, and a fifth flow from TMA 100 to RDE 140.

FIG. 17C shows a data flow for storing data received from the USB port 130 in a bulk data transfer. The first and second data flows of FIG. 17B are replaced by a single data flow from the USB port 130 to TMA 100. The remaining three data flows in FIG. 17C are the same as the final three data flows in FIGS. 17A and 17B, and a description is not repeated.

To store data in the HDD 141, AP 150 sets up a connection through ULP accelerator 120 and/or USB 164 and TMA 100. A unique QID tag is given to the flow. Bandwidth to the HDD 141 for the QID allocated with the DAS 182. When data arrives from the network 131, the data are stored in memory 110 until there are enough data to write to the HDD 141. At this time, the DAS 182 grants access to the QID according to its schedule.

Data Retrieval Flow

Figure 18A:
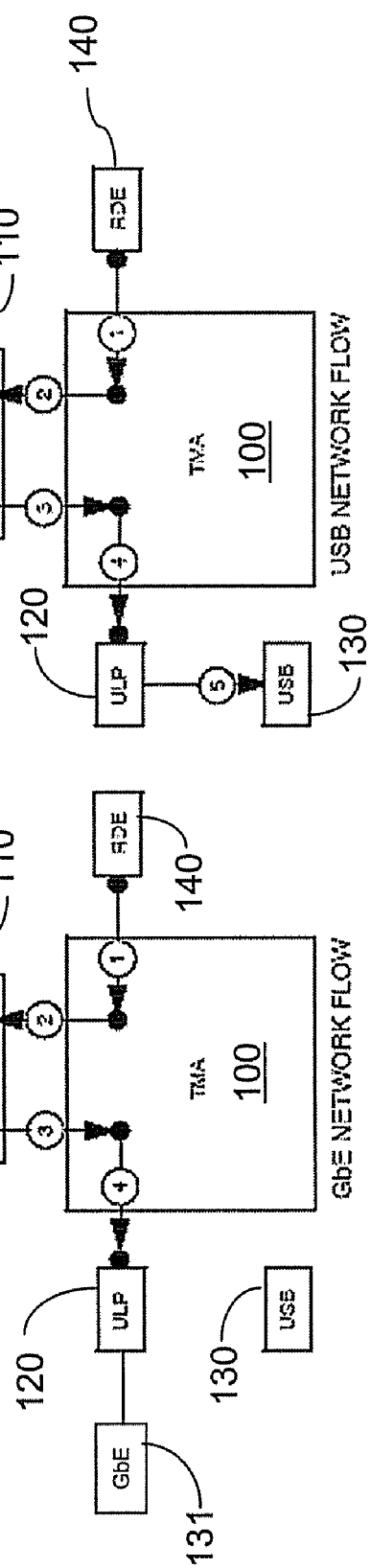
FIGS. 18A-18C are diagrams showing playback of data from disk through the memory buffers.
Figure 18B:
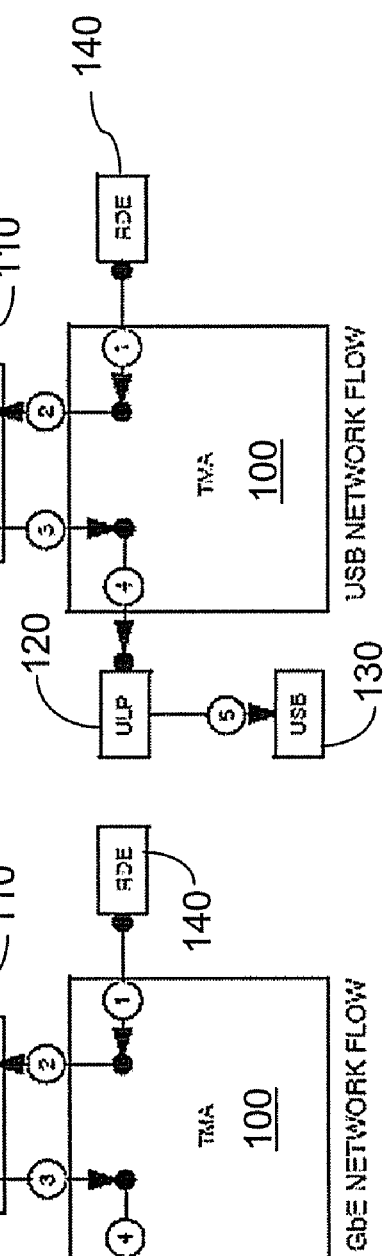
Figure 18C:
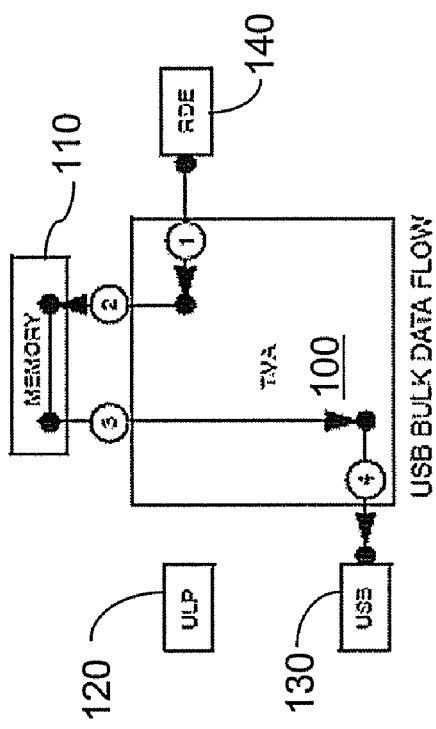

Data retrieved from the HDD 141 to the GbE 131 or USB interface 130 uses the DDR2 memory 110 to buffer data until written to the GbE or USB interface. The TMA 100 controls data access to the DDR2 memory 110 and the HDD 141. The TMA 100 provides schedulers 178, 180, 182 and buffer managers 172, 174, 176 to efficiently and fairly stream data from the HDD 141. FIGS. 18A-18C are block diagrams showing the data retrieval flows. All data flow in network attaches storage system uses the DDR2 memory 110 for temporary storage.

FIG. 18A shows the data flows for playback from HDD 141 to GbE 131. A first data flow retrieves the data from disk 141 to TMA 100 via RDE 140. The second data flow is from TMA 100 to memory 110. The third data flow is from memory 110 to TMA 100. The fourth data flow is from TMA 100 to GbE 131.

To retrieve data from the HDD 141, AP 150 sets up a connection through ULP 120 and/or USB 130 and TMA 100. A unique QID tag is given to the flow. Bandwidth from DDR2 memory 110 to the GbE 131 or USB interface 130 for the QID is allocated with the media playback scheduler (MPS) 180. The MPS 180 schedules data packets to the network interface 131 at the prescribed bandwidth.

Data re retrieved from the HDD 141 for the QID as needed to keep the QID buffer in memory 110 form emptying. HDD accesses for the QID are granted by the DAS according to its schedule.

Media objects and control traffic are received by the Ethernet or USB 2.0 network interface and ULP. The ULP transfers the media objects and control traffic to the TMA, and the TMA stores the arriving traffic in the shared DDR2 memory. Int he case of media object transfers, the incoming object data is stored in DDR2 memory, and transferred to the HDDs for storage. The TMA also manages the retrieval requests from the HDD toward the network interface. During media playback requests, the data is transferred from the HDDs and stored in DDR2 memory and then transferred out to the network interface via the ULP. The TMA manages the storage and retrieval process by providing the appropriate control information to the RDE.

The control traffic destined for inspection by AP 150 is stored in the shared memory 110, and AP 150 is given access to read the packets in memory. AP 150 also uses this mechanism to reorder any of the packets received out-of-order. A part of the shard memory 150 and disk 141 contains program instructions and data for AP 150. TMA 100 manages the access to the memory and disk by transferring control information from disk 141 to memory 110 and memory to disk.

TMA 100 also enables AP 150 to insert data and extract data to and from an existing packet stream. TMA 100 also supports live-TV mode operations where incoming media are simultaneously stored and played back. The stored media is accessed during trick play operations.

An exemplary TMA 100 supports up to 64 flows that are shared among storage, playback, and control, but in other embodiments any desired number of flows may be supported. TMA 100 receives data for storage on the HDDs 141 from the network interfaces (GbE 131 and USB 130) and from the USB 130 for bulk storage. RBM 172 works with the MAS 178 and DAS 182 to transfer data to the HDDs 141. MAS 178 controls all accesses to memory 110 and ensures that the network interfaces 131 and 130 have enough bandwidth for all sessions.

For playback from HDDs 141 to the network interfaces 131, MPS 180 determines the flow of traffic to the network interfaces. PBM 174 works with DAS 182 and MAS 178 to manage the memory 110 and HDD 141 for playback. FBM 170 works with managers 172, 174 and 176 to control the allocation and deallocation of buffers 210, 710 in memory 110. AMM 176 gives AP 150 read and write access to the DDR2 memory 110 and HDD 141.

Live TV/Storage and PVR Example

In the live TV and storage example in FIGS. 17A-17C, a live TV stream is being received by the NAS system 10 on its GbE network interface 131. The stream is being stored for future viewing, and being played back for live TV viewing. A QID is allocated for storing the stream in the HDD 141 and enabled for QID scheduling. Arriving packets are enqueued by RBM 172. Arriving data are stored to disk 141 as the queue fills and played back to the network interface 131. Data received by GbE network interface 131 are stored in DDR2 memory 110. When the buffers 210 in memory 110 fill, write disk accesses are requested and then scheduled by DAS 182.

As shown in FIG. 19A, when the user watches the live video while recording, the data are played back from memory in real-time, without waiting for the data to be stored to the disk 141. Thus, the user is not watching a delayed version of the video data that have been written to disk 141 and then played back from the disk.

As shown in FIG. 19B, if a rewind operation is initiated by the user, playback (from memory 110) at the current point is disabled. Storage continues, as another session QID (x) is set up by AP 150 for a new playback session (indicating disk address/length parameters) for the object. A retrieval operation occurs as a normal retrieval operation and does not need to disable or change the current storage session.

If the user wishes to return to viewing the live TV signal later, the playback session QID (x) is disabled, and the original live session QID (y) is reenabled, and live feed continues. The playback session QID (x) is then de-allocated and the buffers used by session QID (x) are returned to the FBQ.

Head and tail pointers are set by AP 150 and packet length is obtained within the media packet stream (first 32-bit word). Trick play operation is supported by AP 150, which moves the head pointer during fast-forward within the memory buffer.

Recent rewind (a few frames) may be taken directly from memory 110 in near real-time by adjusting the software pointer (to currently active QID). Playback may be paused during such pointer adjustment. This pertains to either live or prerecorded PVR scenarios. As noted above, when the data in a buffer 210 are written to disk, the buffer 210 is not immediately returned to the free buffer pool 700. A few frames worth of data (in the buffers from the head to the play head buffer are retained in the buffer queue and can be played back directly from memory, without retrieving them from disk.

Figure 16A:
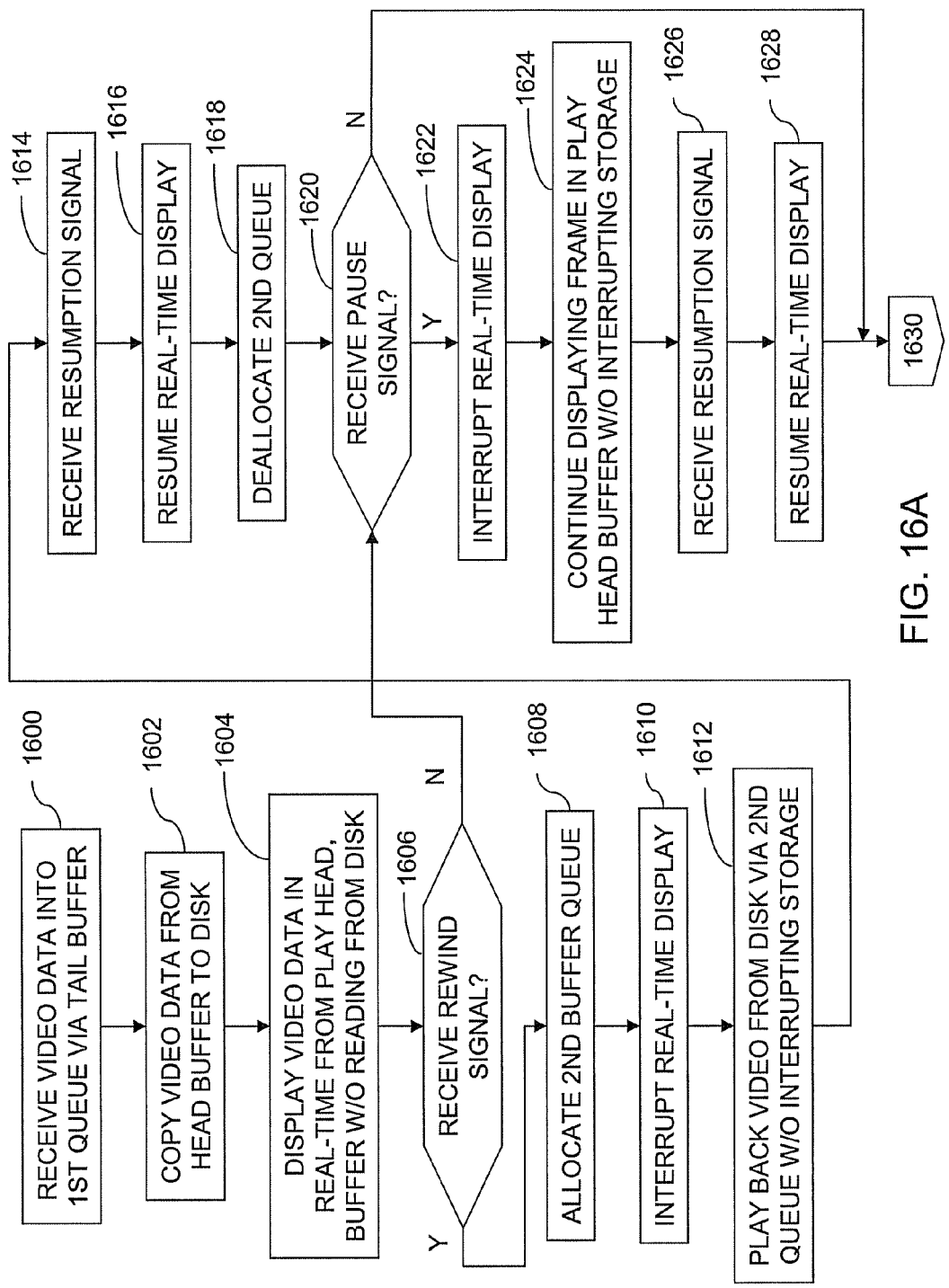
FIGS. 16A and 16B are flow charts showing personal video recorder operation using the system of FIG. 1.
Figure 16B:
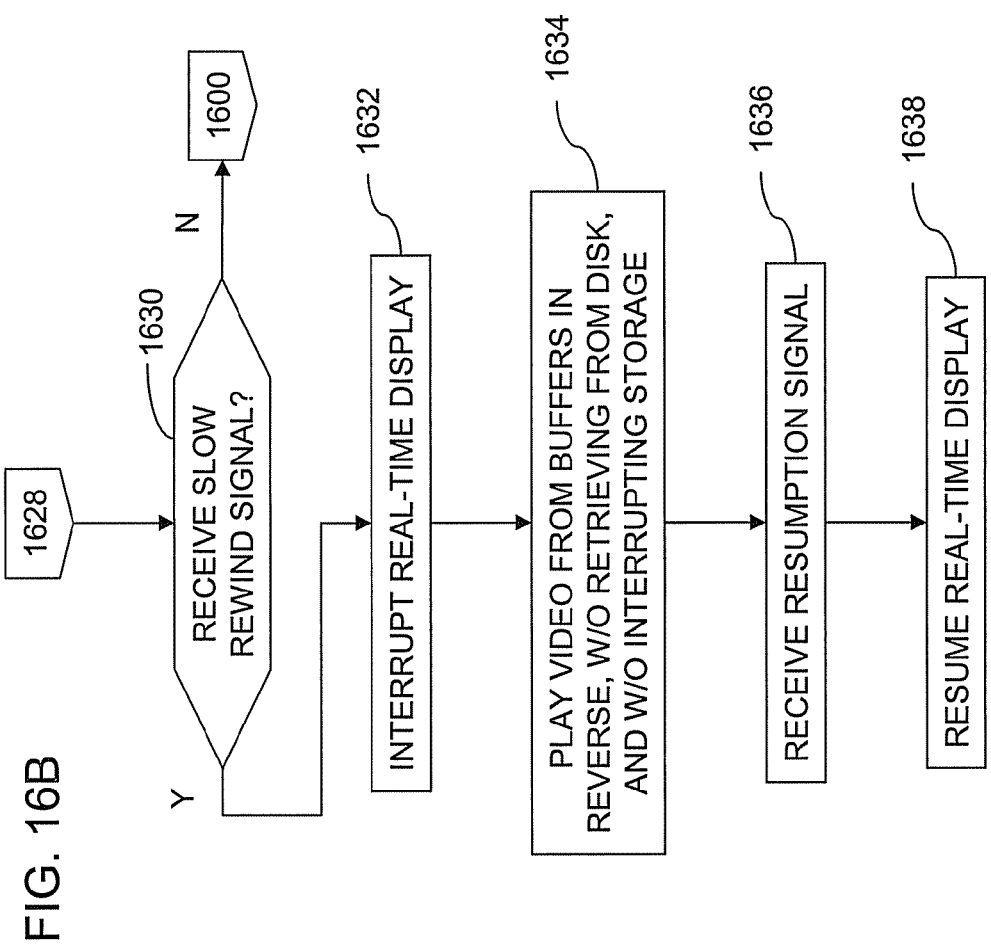

FIGS. 16A and 16B are flow chart diagrams showing an exemplary PVR method using the above described architecture.

Video data are stored in a disk 141 by way of a first queue 200 comprising a linked list of buffers. At step 1600, video data are received into the first queue by way of a tail buffer 210$t$. The tail buffer 210$t$ is at one end of the linked list of buffers in the first queue 200.

At step 1602, video data are copied from a head buffer 210$h$ to the disk 141. The head buffer 210$h$ is at another end of the linked list of buffers in the first queue.

At step 1604, the video data are displayed in real-time directly from the buffers in the queue, without retrieving the displayed video data from the disk, and without interrupting the storing step. The displaying step includes displaying video data in a "play head buffer" to which the play head buffer pointer (PHeadBufPtr) points. Note that as used herein, the term "real time" broadly encompasses the display of data that is stored in buffers in memory 110 and retrieved from the memory buffers immediately thereafter, without retrieving the data from the disk 141.

At step 1606, PBM 174 determines if a rewind signal is received (for example, from a media output device by way of the USB port 130). When a rewind signal is received, step 1608 is executed. Otherwise, step 1620 is executed.

At step 1608, PBM 174 allocates a second queue comprising a second linked list of buffers.

At step 1610, the real-time video data displaying step is interrupted.

At step 1612, the video data are played back from the disk 141 by way of the second queue in response to the rewind signal, without interrupting the storing steps (1600 and 1602), which continues via the first queue. The data in the play head buffer (to which the play head buffer pointer points) are the most recent data received into the second queue. There is no need to retrieve into the second queue the data that are stored between the play head buffer and the tail in the first queue, because those data have not yet been displayed, and would not be part of a rewind operation.

At step 1614, a resumption signal is received (for example, from a media output device by way of the USB port 130).

At step 1616, the real-time video data displaying step (of displaying the incoming video data from the first buffer queue during storage) is resumed in response to the resumption signal.

At step 1618, the second queue (which was used for buffering data during replay from the disk 141) is de-allocated.

At step 1620, PBM 174 determines if a pause signal is received (for example, from a media output device by way of the USB port 130). When a pause signal is received, step 1622 is executed. Otherwise, step 1630 is executed.

At step 1622, the real-time video data displaying step is interrupted.

At step 1624, the system continues to display a single frame that is being displayed at the time the pause signal is received, without interrupting the storing step.

At step 1626, a resumption signal is received (for example, from a media output device by way of the USB port 130).

At step 1628, the real-time video data displaying step (of displaying the incoming video data from the first buffer queue during storage) is resumed in response to the resumption signal.

At step 1630, PBM 174 determines if a slow-rewind signal is received (for example, from a media output device by way of the USB port 130). When a slow-rewind signal is received, step 1632 is executed. Otherwise, step 1600 is executed.

At step 1632, the real-time video data displaying step is interrupted.

At step 1634, the system displays the most recently displayed frames of video data from the first buffer queue 200 in reverse (i.e., last-in, first-out) in response to the slow-rewind signal, without retrieving the most recently displayed frames of video data from the disk, and without interrupting the storing step. These data are located in the buffers 210 between the play head buffer 210ph (most recently displayed) and the head buffer 210h (least recently displayed). Thus, during slow rewind, the data are displayed beginning with the data in the play head buffer 210ph, followed by successive frames as far back as the head buffer 210h. Concurrently, the data between the play head buffer 210ph and the tail buffer 210t are stored into the disk 141.

At step 1636, a resumption signal is received (for example, from a media output device by way of the USB port 130).

At step 1638, the real-time video data displaying step (of displaying the incoming video data from the first buffer queue 200 during storage) is resumed in response to the resumption signal.

In some embodiments, the apparatus describe above is implemented in application specific integrated circuitry (ASIC). In some embodiments, the ASIC is designed manually. In some embodiments, a computer readable medium is encoded with pseudocode, wherein, when the pseudocode is processed by a processor, the processor guarantees GDSII data for fabricating an application specific integrated circuit that performs a method. An example of a suitable software program suitable for generating the GDSII data is "ASTRO" by Synopsys, Inc. of Mountain View, Calif.

In other embodiments, the invention may be embodied in a system having one or more programmable processors and/or coprocessors. The present invention, in sum or in part, can also be embodied in the form of program code embodied in tangible media, such as floppy diskettes, CD-ROMs, hard-drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber-optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method comprising the steps of:
   providing a free buffer pool in a memory including a non-negative number of free buffers that are not allocated to a queue for buffering data, said queue including a head buffer from which data are least recently read, for playback from a storage device; and said queue including a play head buffer, from which data are currently being read for playback from the storage device;
   receiving a request to add one of the free buffers to the queue;
   allocating one of the free buffers to the queue in response to the request, if the queue has fewer than a first predetermined number of buffers associated with a session type of the queue;
   allocating one of the free buffers to the queue, if a number of buffers in the queue is at least as large as the first predetermined number and less than a second predetermined number associated with the session type, and the number of free buffers is greater than zero, and
   de-allocating at least the head buffer from the queue, if a number of buffers between the head buffer and the play head buffer is at least a threshold value, and a number of buffers in the queue is greater than or equal to the first predetermined number.

2. The method of claim 1, further comprising:
   allocating buffers in the memory to one of more additional queue associated with one or more additional sessions, each session having a session type;
   allocating one of the free buffers to one or more of the additional queues, if:
     a number of buffers in each respective one of the additional queues to which the free buffers are to be allocated is less than a respective threshold associated with the session type of that one of the additional queues, the number of free buffers is greater than zero, and a total number of allocated buffers in the queue and the additional queues is less than a predetermined maximum total buffer occupancy value.

3. The method of claim 2, further comprising:

de-allocating one of the group consisting of the queue and one of the additional queues;

returning the buffers that were allocated to the de-allocated queue to the free buffer pool.

4. The method of claim 2, further comprising:

rejecting a request to allocate another buffer to the queue, if:

the number of buffers ion the queue is greater than or equal to the second predetermined number associated with the session type, or the number of free buffers is zero, or a total number of occupied buffers in the queue and the additional queues equals a predetermined maximum total buffer occupancy value.

5. The method of claim 1, further comprising moving a head buffer pointer from the head buffer to an adjacent buffer in the queue when the head buffer is de-allocated.

6. The method of claim 1, further comprising increasing the number of buffers in the free buffer pool when the head buffer is de-allocated.

7. The method of claim 1, further comprising:

receiving data to be written to the memory; and determining whether the queue has a buffer with available space in which to write at least a portion of the data, wherein the request to add one of the free buffers to the queue is received when a determination is made that the queue has no previously allocated buffer with available space.

8. A system comprising:

a memory having a free buffer pool including a non-negative number of free buffers that are not allocated to a queue; and a free buffer pool manager for receiving a request to add one of the free buffers to the queue;

wherein the free buffer pool manager allocates one of the free buffers to the queue in response to the request, if the queue has fewer than a first predetermined number of buffers associated with a session type of the queue;

the free buffer pool manger allocates one of the free buffers to the queue, if a number of buffers in the queue is at least as large as the first predetermined number and less than a second predetermined number associated with the session type, and the number of free buffers is greater than zero;

the queue includes a head buffer from which data are least recently read, for playback from a storage device;

the queue includes a play head buffer, from which data are currently being read for playback from the storage device; and the free buffer pool manager de-allocates at least the head buffer from the queue, if a number of buffers between the head buffer and the play head buffer is at least a threshold value, and a number of buffers in the queue is greater than or equal to the first predetermined number.

9. The system of claim 8, further comprising:

means for receiving data to be written to the queue;

means for determining whether the queue has a buffer with available space in which to write at least a portion of the data, wherein the free buffer pool manager receives the request to add one of the free buffers to the queue is received when a determination is made that the queue has no previously allocated buffer with available space.

10. The system of claim 8, wherein the free buffer pool manager further comprises:

means for allocating buffers in the memory to one or more additional queues associated with one or more additional sessions;

means for allocating one of the free buffers to one or more of the additional queues, if:

a number of buffers in each respective one of the additional queues to which the free buffers are to be allocated is less than a respective threshold associated with the session type of that one of the additional queues, the number of free buffers is greater than zero, and a total number of allocated buffers in the queue and the additional queues is less than a predetermined maximum total buffer occupancy value.

11. A computer readable storage medium encoded with pseudocode, wherein, when the pseudocode is processed by a processor, the processor generates GDSII data for fabricating an application specific integrated circuit that performs a method comprising the steps of:

providing a free buffer pool in a memory including a non-negative number of free buffers that are not allocated to a queue for buffering data, said queue including a head buffer from which data are least recently read, for playback from a storage device; and said queue including a play head buffer, from which data are currently being read for playback from the storage device;

receiving a request to add one of the free buffers to the queue;

allocating one of the free buffers to the queue in response to the request, if the queue has fewer than a first predetermined number of buffers associated with a session type of the queue;

allocating one of the free buffers to the queue, if a number of buffers in the queue is at least as large as the first predetermined number and less than a second predetermined number associated with the session type, and the number of free buffers is greater than zero, and de-allocating at least the head buffer from the queue, if a number of buffers between the head buffer and the play head buffer is at least a threshold value, and a number of buffers in the queue is greater than or equal to the first predetermined number.

12. The computer readable storage medium of claim 11, wherein the method further comprises:

receiving data to be written to the memory; and determining whether the queue has a buffer with available space in which to write at least a portion of the data, wherein the request to add one of the free buffers to the queue is received when a determination is made that the queue has no previously allocated buffer with available space.

13. The computer readable storage medium of claim 11, wherein the method further comprises:

allocating buffers in the memory to one or more additional queues associated with one or more additional sessions;

allocating one of the free buffers to one or more of the additional queues, if:

a number of buffers in each respective one of the additional queues to which the free buffers are to be allocated is less than a respective threshold associated with the session type of that one of the additional queues, the number of free buffers in the queue is greater than zero, and a total number of allocated buffers in the queue and the additional queues is less than a predetermined maximum total buffer occupancy value.

14. The computer readable storage medium of claim 11, wherein the method further comprises:

rejecting a request to allocate another buffer to the queue, if:

the number of buffers in the queue is greater than or equal to the second predetermined number associated with the session type, or the number of free buffers is zero, or a total number of occupied buffers in the queue and the additional queues equals a predetermined maximum total buffer occupancy value.

15. The computer readable storage medium of claim 11, wherein the method further comprises moving a head buffer pointer from the head buffer to an adjacent buffer in the queue when the head buffer is de-allocated.

* * * * *